United States Patent
Takao

(10) Patent No.: US 7,590,814 B2
(45) Date of Patent: Sep. 15, 2009

(54) DATA RECORDING DEVICE AND ACCESS CONTROL METHOD USING PASSWORD AUTHENTICATION

(75) Inventor: Hidenobu Takao, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 253 days.

(21) Appl. No.: 11/399,960

(22) Filed: Apr. 7, 2006

(65) Prior Publication Data

US 2006/0230285 A1 Oct. 12, 2006

(30) Foreign Application Priority Data

Apr. 12, 2005 (JP) ............................. 2005-114529

(51) Int. Cl.
*G06F 12/00* (2006.01)
(52) U.S. Cl. ...................... 711/164; 711/114; 711/162; 711/163
(58) Field of Classification Search ........................ None
See application file for complete search history.

(56) References Cited

U.S. PATENT DOCUMENTS

| | | | |
|---|---|---|---|
| 5,822,782 A | 10/1998 | Humlicek et al. | |
| 5,900,010 A | 5/1999 | Aoki et al. | |
| 6,233,654 B1 | 5/2001 | Aoki et al. | |
| 6,779,121 B1* | 8/2004 | Uchida et al. | ................. 726/19 |
| 2002/0108023 A1 | 8/2002 | Constable et al. | |
| 2004/0158763 A1 | 8/2004 | Wang et al. | |
| 2006/0064560 A1* | 3/2006 | Mizuno et al. | ............... 711/164 |

FOREIGN PATENT DOCUMENTS

| | | |
|---|---|---|
| EP | 0 949 556 A2 | 10/1999 |
| EP | 1 521 268 A2 | 4/2005 |
| JP | 09-245415 A | 9/1997 |
| WO | 93/06695 A1 | 4/1993 |

* cited by examiner

*Primary Examiner*—Reginald G Bragdon
*Assistant Examiner*—Shawn X Gu
(74) *Attorney, Agent, or Firm*—Canon U.S.A., Inc. I.P. Division

(57) ABSTRACT

A data recording device of the present invention acquires passwords of individual recording media attached to a plurality of medium attaching units from a password storage unit which stores the passwords set to the recording media having a password locking function, the device judges whether or not the individual recording media are accessible by a RAID recording system by use of the acquired passwords, and the device accesses data of each recording medium by the RAID recording system in a case where the medium is accessible by the RAID recording system.

20 Claims, 29 Drawing Sheets

FIG. 15

| BYTE# | BIT7 | BIT6 | BIT5 | BIT4 | BIT3 | BIT2 | BIT1 | BIT0 |
|---|---|---|---|---|---|---|---|---|
| 0 | RESERVED (ALL 0) | | | | ERASE (1) | LOCK_UNLOCK (0) | CLEAR_PASSWORD (0) | SET_PASSWORD (0) |

1505 — BIT3 ERASE
1501 — BIT2 LOCK_UNLOCK
1502 — BIT1 CLEAR_PASSWORD
1503 — BIT0 SET_PASSWORD

FIG. 17

| | AFTER EXECUTION OF SERVICE | | AFTER EXECUTING SERVICE, ANOTHER SERVICE WAS NOT EXECUTED, POWER SUPPLY ONCE ENDED, AND POWER SUPPLY WAS PERFORMED AGAIN | |
|---|---|---|---|---|
| | PASSWORD SET SITUATION | PASSWORD LOCKING SITUATION | PASSWORD SET SITUATION | PASSWORD LOCKING SITUATION |
| SERVICE (C.1) WAS EXECUTED SUCCESSFULLY | SET | UNLOCKED | SET | LOCKED |
| SERVICE (C.2) WAS EXECUTED SUCCESSFULLY | SET | UNLOCKED | SET | LOCKED |
| SERVICE (C.3) WAS EXECUTED SUCCESSFULLY | NON-SET | UNLOCKED | NON-SET | UNLOCKED |
| SERVICE (C.4) WAS EXECUTED SUCCESSFULLY | SET | LOCKED | SET | LOCKED |
| SERVICE (C.5) WAS EXECUTED SUCCESSFULLY | SET | UNLOCKED | SET | LOCKED |
| SERVICE (C.6) WAS EXECUTED SUCCESSFULLY | NON-SET | UNLOCKED | NON-SET | UNLOCKED |

FIG. 20

| Size(Byte) | Contents |
|---|---|
| 8 | OEM Name |
| 2 | Sector size |
| 1 | Cluster size |
| 2 | Reserve sector number |
| 1 | Number of FATs |
| 2 | Root directory entry number |
| 2 | Total sector number |
| 1 | Medium descriptor |
| 2 | FAT size (sector unit) |
| 2 | Track size (sector unit) |
| 2 | Head number |
| 4 | Hidden sector number |
| 4 | 32 bit sector number |
| 1 | Drive ID |
| 1 | Reserve |
| 1 | Boot signature |
| 4 | Serial number |
| 11 | Volume name |
| 8 | File system type |

DATA RECORDING DEVICE AND ACCESS CONTROL METHOD USING PASSWORD AUTHENTICATION

BACKGROUND OF THE INVENTION

1. Field of the Invention

The present invention relates to a data access technology with respect to a plurality of recording media.

2. Description of the Related Art

There is a known data recording device which is provided with a plurality of medium attaching units such as card slots and which records data in recording media attached to the respective medium attaching units by a redundant array of independent disks (RAID) recording system. For example, in an image pickup device (which is a recording device such as a digital camera or a digital video camera), a recording medium such as a Secured Digital (SD) memory card (registered trademark) can be inserted and removed. The inserted recording medium can store a photographed image, an image obtained by editing the photographed image and the like as the data. An image pickup device having a communication function can transfer the image data and the like stored in the recording medium to an image processing device having a communication function, so that the data can be reproduced by the image processing device. A removable recording medium can be removed from the image pickup device, and can be inserted into the image processing device which includes a controller capable of accessing the recording medium. Moreover, the image processing device can read and reproduce the recorded data from the inserted recording medium.

In addition, in recent years, there has been realized a recording medium having a write protect function. As to this recording medium, write prohibition and permission are set to the recording medium itself, or the write prohibition and permission can be set to a certain region. The recording medium is also provided with a hardware switch or a password, so that the write prohibition and permission are set to the recording medium itself.

On the other hand, in recent years, with improvement of a performance of a solid image pickup device (CCD or the like), the size of an output image, and the number of frames per unit time in the whole screen have increased in the image pickup device. It is also demanded that the time from when photographing ends until the next photographing becomes possible, that is the photographing interval, be shortened. Owing to these factors, it is a requirement that the transfer speed of the data to the recording medium be increased.

Heretofore, to solve the problem, in the case where the image is continuously photographed, the photographed image may be temporarily stored in an internal memory of the image pickup device, and the photographed image is transferred from the internal memory to the recording medium at a time when all photographing ends. This can shorten the photographing interval. However, there is a restriction on the internal memory resource, and a problem has occurred that the photographing cannot be performed, if the internal memory is used up.

To solve this problem, a data recording device of Japanese Patent Application Laid-Open No. 9-245415 corresponding U.S. Pat. Nos. 5,900,010, and 6,233,654 can control the recording medium using the RAID recording system defined by function and performance to catch up with the high transfer speed. This device controls attachment and detachment of the recording medium so as to record subsequent information in the next inserted recording medium in a case where there is not any empty region in the recording medium.

The RAID recording system is used in the data recording device of the above document. Therefore, even when the recording medium is removed from the data recording device, and inserted into another information processing device, the data of the recording medium cannot be read. However, there has been a problem that the information processing device and the recording medium might cause an incorrect operation.

Furthermore, in the data recording device of Patent Document 1 described above, An order of the accesses of the RAID recording system is given to each of the card slots themselves into which the removable recording media are inserted. Therefore, when the recording medium is once removed, and inserted into another card slot of the same data recording device, the slot cannot be accessed by the RAID recording system. Therefore, when once removing the recording medium, and inserting the medium again for use, a user needs to memorize the card slot into which the removed recording medium has been inserted.

SUMMARY OF THE INVENTION

The present invention has been developed to mitigate the above-described problems, and an aspect is to provide a data recording device and an access control method in which data can be read and written at a high speed and in which the data recorded in a recording medium can be protected.

According to a first exemplary embodiment of the present invention, a data recording device is provided which includes comprising a plurality of individual recording medium attaching units; a password storage unit for storing passwords associated with said individual recording medium attaching units; an acquisition unit which acquires said passwords for individual recording media attached to said plurality of medium attaching units, the individual recording media having a password locking function; an access authentication unit which judges whether or not the individual recording media attached to the plurality of medium attaching units are accessible by a RAID recording system using the passwords stored in the password storage unit; and an access control unit which accesses data from each recording medium using the RAID recording system in the case where the access authentication unit authenticates that the individual recording media attached to the plurality of medium attaching units are accessible by the RAID recording system.

According to an aspect of the aforementioned embodiment, the data recording device may further include a password setting unit which sets the passwords to the individual recording media attached to the plurality of medium attaching units, wherein the password storage unit stores the passwords set by the password setting unit. And according to another aspect of the aforementioned embodiment, the access authentication unit authenticates that each recording medium is accessible by the RAID recording system on conditions that the password stored in the password storage unit agrees with the passwords set to the recording media attached to the plurality of medium attaching units.

According to another aspect of the present embodiment, the data recording device may further include a password change/re-set unit which changes or re-sets the password set to the recording medium so as to allow the password stored in the password storage unit to agree with the password set to the recording medium attached to each of the plurality of medium attaching units in a case where the passwords do not agree with each other. Furthermore, according to another aspect of the present embodiment, the access authentication unit performs the authentication depending on whether or not all the recording media attached to the plurality of medium attaching units are combined so as to be accessible by the RAID recording system.

Moreover, according to another aspect of the aforementioned embodiment, the access authentication unit authenticates that all the recording media are combined so as to be accessible by the RAID recording system in a case where all the recording media attached to the plurality of medium attaching units are formatted by the RAID recording system. Moreover, according to another aspect of the present invention, the access control unit accesses the recording media attached to the plurality of medium attaching units in order, and the access authentication unit authenticates that all the recording media are combined so as to be accessible by the RAID recording system in a case where predetermined information which defines an order of the access by the access authentication unit is recorded in each recording medium.

Additionally, according to another aspect of the present embodiment, the access control unit reads and writes the data using the RAID recording system in the order defined based on the predetermined information recorded in each attached recording medium even in a case where the recording medium is attached to any medium attaching unit. Still further, according to another aspect of the present embodiment, the predetermined information recorded in each recording medium may include inherent information of the recording medium, and inherent information of a recording medium whose recording order is subsequent to the recording medium.

Furthermore, according to another aspect of the present embodiment, the access control unit sets again a format of the RAID recording system to a plurality of recording media having empty regions, and continues recording remaining data using the RAID recording system with respect to the plurality of recording media to which the format has been set again in a case where there is generated a recording medium whose memory becomes full among the plurality of recording media attached to the plurality of medium attaching units during the recording of the data by the RAID recording system.

According to another embodiment of the present invention, an access control method is provided which includes an acquisition step of acquiring passwords of individual recording media attached to a plurality of medium attaching units from a password storage unit which stores the passwords set to the recording media, the recording media having a password locking function; an access authentication step of judging whether or not the individual recording media attached to the plurality of medium attaching units are accessible by a RAID recording system by use of the passwords acquired by the acquisition step; and an access control step of accessing data of each recording medium using the RAID recording system in a case where the access authentication step authenticates that the individual recording media attached to the plurality of medium attaching units are accessible to the RAID recording system.

According to another aspect of the aforementioned embodiment, the access control method may also include a password setting step of setting the passwords to the individual recording media attached to the plurality of medium attaching units, wherein the password storage unit stores the passwords set by the password setting step. And, according to another aspect of the present embodiment, the access authentication step authenticates that each recording medium is accessible by the RAID recording system on condition that the password stored in the password storage unit agrees with the passwords set to the recording media attached to the plurality of medium attaching units.

Furthermore, according to another aspect of the embodiment, the access control method may also include a password change/re-set step of changing or setting again the password set to the recording medium so as to allow the password stored in the password storage unit to agree with the password set to the recording medium attached to each of the plurality of medium attaching units in the case where the passwords do not agree with each other. Moreover, according to another aspect of the present invention, the access authentication step performs the authentication depending on whether or not all the recording media attached to the plurality of medium attaching units are combined so as to be accessible by the RAID recording system.

Still further, according to another aspect of the instant embodiment, the access authentication step authenticates that all the recording media are combined so as to be accessible by the RAID recording system in the case where all the recording media attached to the plurality of medium attaching units are formatted by the RAID recording system. Also, according to another aspect of the present invention, the access control step accesses the recording media attached to the plurality of medium attaching units in order by the RAID recording system, and the access authentication step authenticates that all the recording media are combined so as to be accessible by the RAID recording system in a case where predetermined information which defines an order of the access by the access authentication step is recorded in each recording medium.

Moreover, according to another aspect of the present embodiment, the access control step reads and writes the data by the RAID recording system in the order defined based on the predetermined information recorded in each attached recording medium even in a case where the recording medium is attached to any medium attaching unit. And further, according to another aspect of the instant embodiment, the predetermined information recorded in each recording medium may include inherent information of the recording medium, and inherent information of a recording medium whose recording order is subsequent to the recording medium.

Furthermore, according to yet another aspect of the present invention, the access control step sets again a format of the RAID recording system to a plurality of recording media having empty regions, and continues recording of remaining data by the RAID recording system with respect to the plurality of recording media to which the format has been set again in a case where there is generated a recording medium whose memory becomes full among the plurality of recording media attached to the plurality of medium attaching units during the recording of the data by the RAID recording system.

Further features of the present invention will become apparent from the following description of exemplary embodiments (with reference to the attached drawings).

BRIEF DESCRIPTION OF THE DRAWINGS

FIG. 15 is a conceptual diagram showing a structure of password control data in a password control service (C. 6);

FIG. 17 is a diagram showing setting states of recording medium passwords and password locking in a case where the card access services (C. 1) to (C. 6) are executed successfully;

FIG. 20 is a diagram showing parameters included in a BIOS parameter block (BPB);

DESCRIPTION OF THE EMBODIMENTS

Embodiments of the present invention will be described hereinafter with reference to the drawings.

First Exemplary Embodiment

Figure 1:
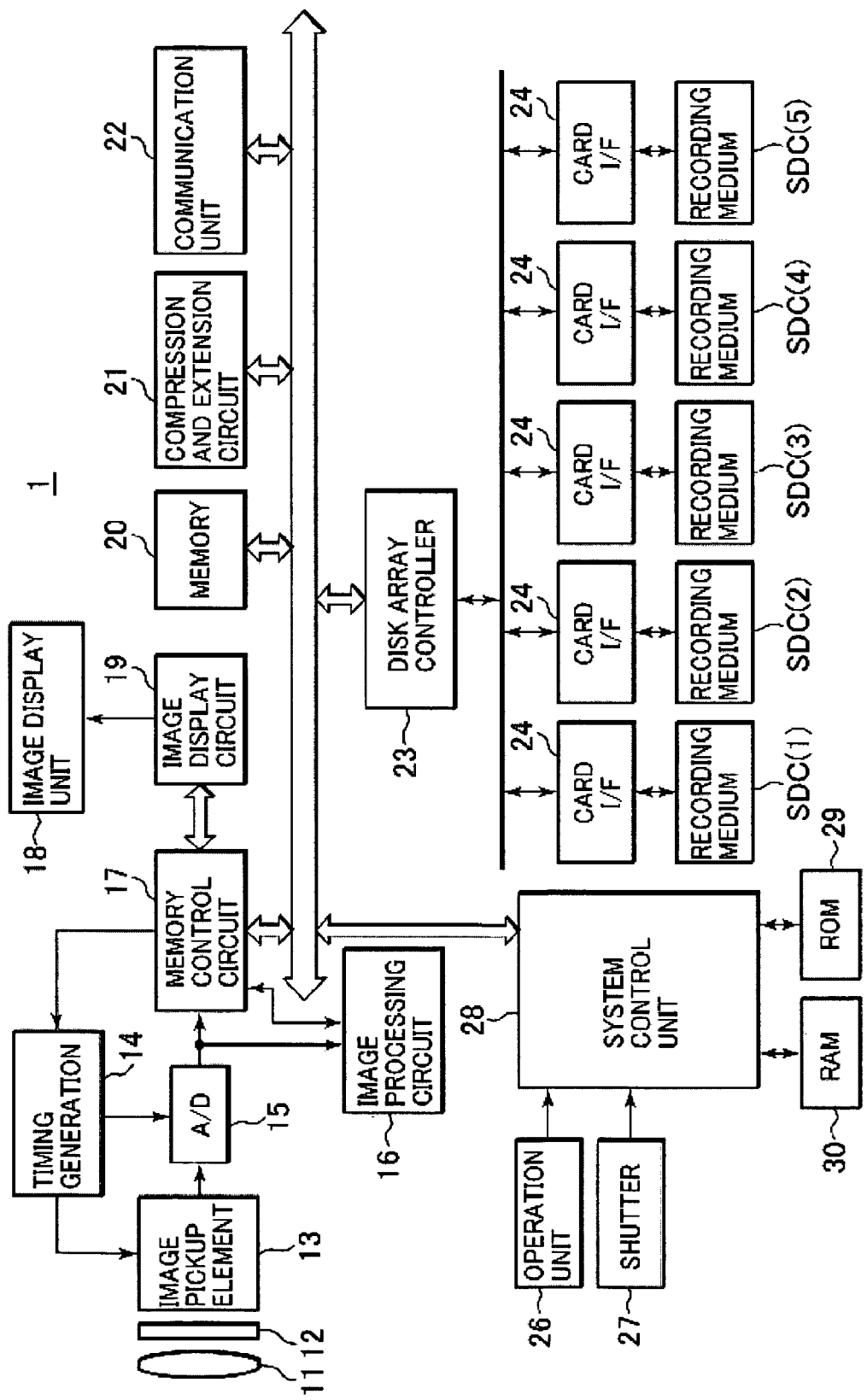
FIG. 1 is a block diagram showing a data recording device of a first embodiment.

FIG. 1 is a block diagram showing a data recording device in a first embodiment. The present data recording device is constituted as an image pickup device such as a digital camera. This image pickup device 1 includes: a memory control circuit 17; a system control unit 28; a photographing lens 11; a shutter 12 having an aperture function; and an image pickup element 13 which converts an optical image into an electric signal. The device also includes: an A/D converter 15 which converts an analog signal output of the image pickup element 13 into a digital signal; a timing generation circuit 14 which supplies a clock signal or a control signal to the image pickup element 13 and the A/D converter 15; and an image processing circuit 16. The timing generation circuit 14 is controlled by the memory control circuit 17 and the system control unit 28.

The image processing circuit 16 performs predetermined pixel interpolation processing or color conversion processing with respect to data from the A/D converter 15 or the memory control circuit 17. The image processing circuit 16 performs predetermined calculation processing by use of photographed image data, and the system control unit 28 controls exposure and ranging based on obtained calculation results. Here, there are performed, for example, auto focus (AF) processing of a through-the-lens (TTL) system, automatic exposure (AE) processing, and flash pre-emission (EF) processing. The image processing circuit 16 further performs predetermined calculation processing by use of the photographed image data, and auto white balance (AWB) processing is also performed based on the resultant calculation result.

The image pickup device 1 also includes: the memory control circuit 17; the timing generation circuit 14; an image display circuit 19; a memory 20; a compression and extension circuit 21; and a communication unit 22. The memory control circuit 17 controls the A/D converter 15, the timing generation circuit 14, the image processing circuit 16, the image display circuit 19, the memory 20, and the compression and extension circuit 21. An image display unit 18 connected to the image display circuit 19 is an LCD or the like, and image data for the system, written in the memory 20, is displayed in the image display unit 18 via the memory control circuit 17 and the image display circuit 19. When the photographed image data is displayed using the image display unit 18, an electronic view finder (EVF) function can be realized. The communication unit 22 has any or a plurality of functions of RS232C, USB, IEEE1394, modem, cable communication such as LAN, infrared communication such as IrDA, and radio communication such as Bluetooth, 802.11b.

The memory 20 stores photographed static and dynamic images, and has a storage capacity sufficient for storing a large number of static images and a dynamic image for a long time, and it is possible to write a large amount of images into the memory 20 at a high speed even in a case where a plurality of images are continuously photographed. The memory 20 is also usable as an operation region of the system control unit 28.

The compression and extension circuit 21 compresses and extends image data by adaptive discrete cosine transform (ADCT), wave rate conversion or the like. The compression and extension circuit 21 reads out the image stored in the memory 20 to perform the compression or extension processing, and writes the processed data into the memory 20. The system control unit 28 controls the whole image pickup device 1.

The image pickup device 1 also includes a RAM 30, a ROM 29, an operation unit 26, and a shutter 27. The RAM 30 stores constants, variables and the like for operation of the system control unit 28. The ROM 29 stores operation programs, parameters and the like for the system control unit 28. The operation unit 26 and the shutter 27 are disposed in order to input various types of operation instructions of the system control unit 28, and are constituted by combining a plurality of switches, dials, touch panels and the like.

The image pickup device 1 also includes a disk array controller 23. The disk array controller 23 accesses, via a plurality of card interfaces (I/Fs) 24, recording media (SDC(1) to SDC(5)) which are external storage devices such as Secured Digital (SD) Memory Cards (registered trademark) and hard disks. One recording medium SDC is insertable into each card I/F 24. The disk array controller 23 reads and writes data with respect to the recording media SDC via the card I/Fs 24 by recording system of redundant array of independent disks (RAID 1 to 5) defined by functions and performances. It is to be noted that a plurality of card I/Fs 24 may be used, and there is not any restriction on the number of the card I/Fs. Heretofore, only RAID1, RAID3, and RAID5 were actually used from the RAID1-RAID5 disk array systems.

Figure 2:
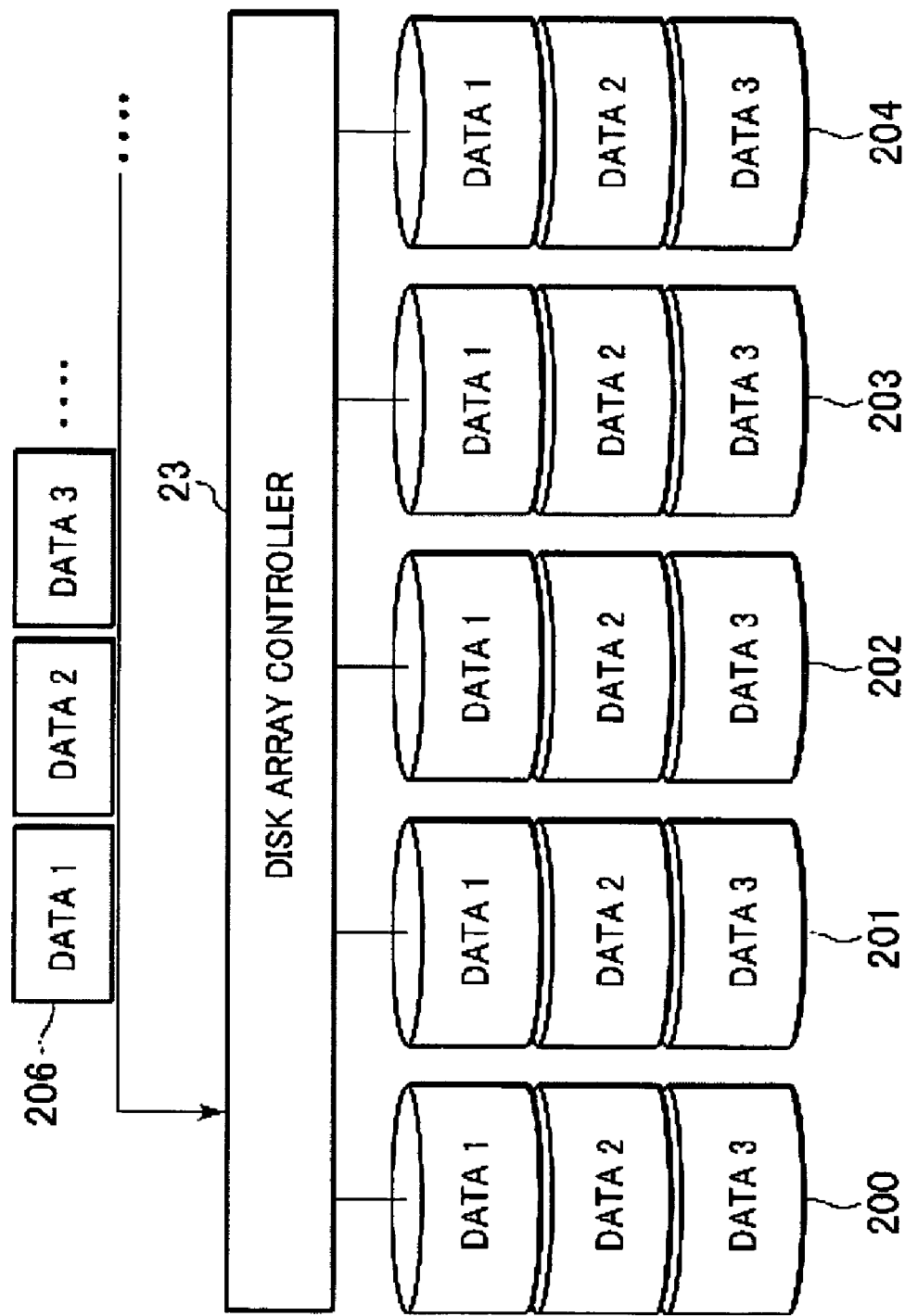
FIG. 2 is a conceptual diagram of an RAID1 recording system in which data is recorded using a mirroring system.
Figure 3:
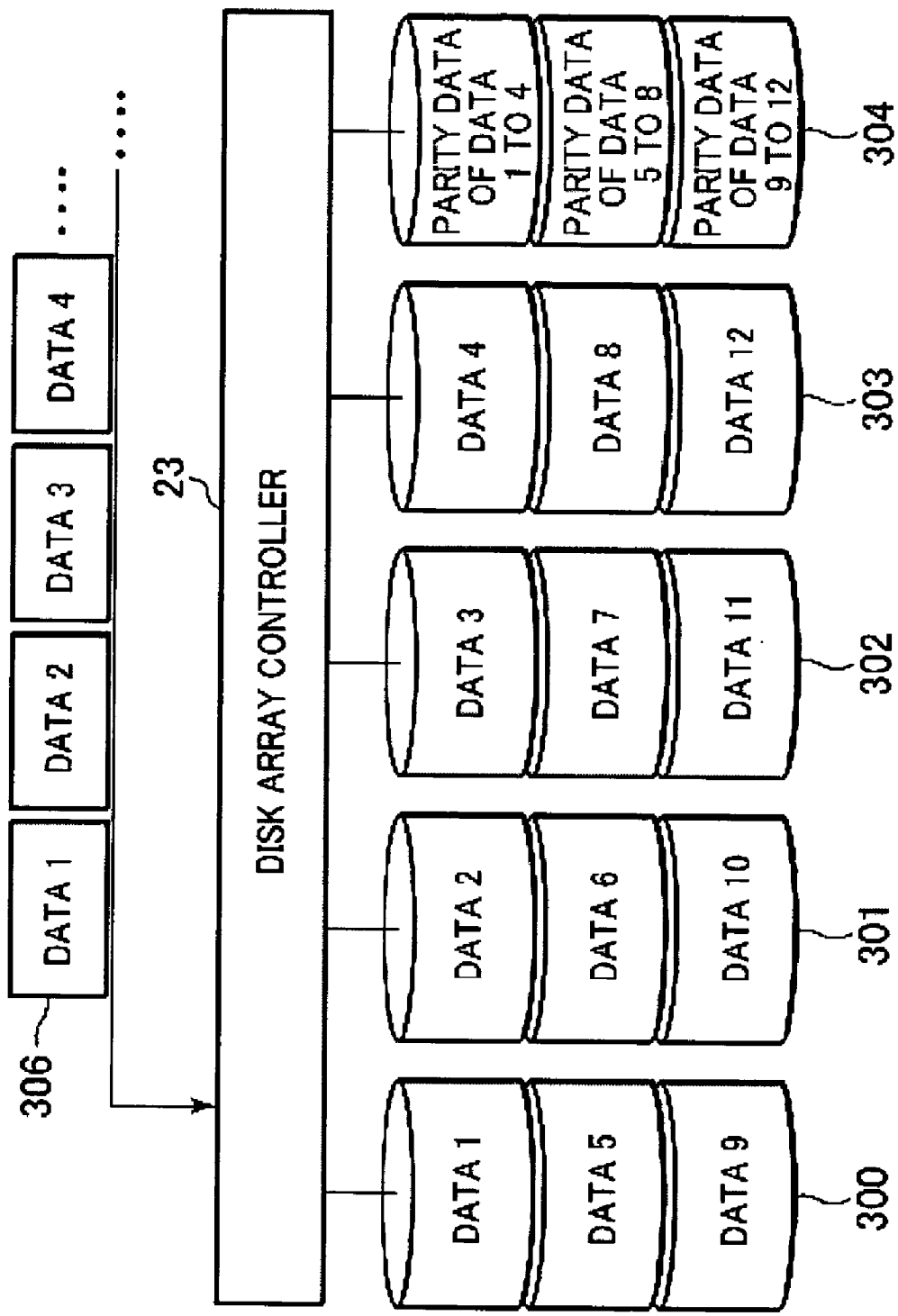
FIG. 3 is a conceptual diagram of an RAID 3 recording system in which data is recorded using a striping system.
Figure 4:
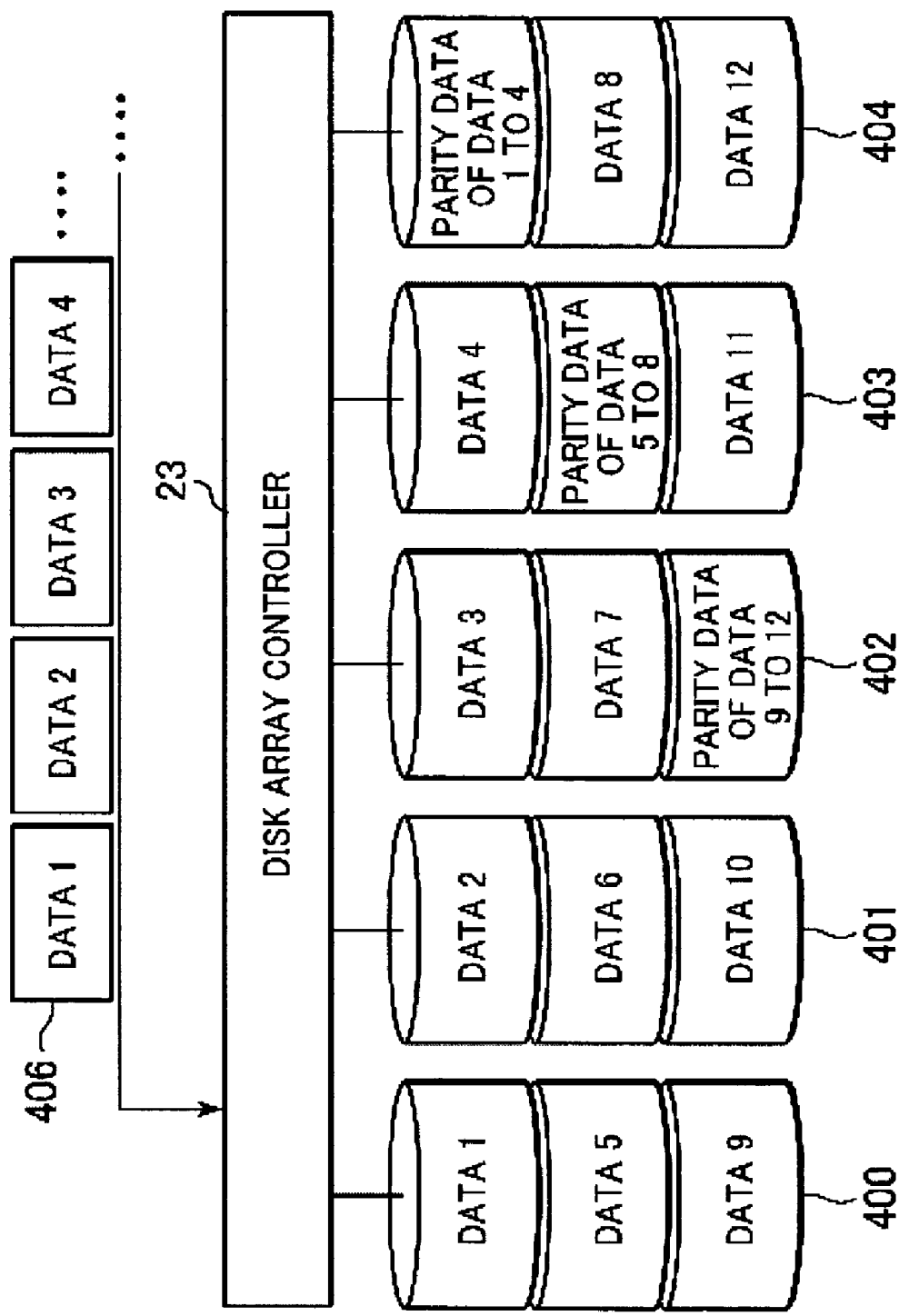
FIG. 4 is a conceptual diagram of an RAID5 recording system in which data is recorded using a striping system.

Next, there will be generally described the RAID1, RAID3, and RAID5 recording systems with reference to FIGS. 2 to 4.

FIG. 2 is a conceptual diagram of the RAID1 recording system in which data is recorded using a mirroring system. In FIGS. 2 to 4, disk drives 200 to 204, 300 to 304, and 400 to 404 correspond to the recording media SDC(1) to SDC(5).

In the RAID 1 recording system, a series of data items 206 constituted by data 1, data 2, data 3, . . . are recorded using a mirroring system. In this mirroring system, the disk drive 200 is regarded as a master disk, and the disk drives 201 to 204 are regarded as preliminary disks. Moreover, the same data (data 1, data 2, data 3, . . . ) as those of the master disk are recorded in each preliminary disk. Accordingly, even when the master disk breaks, the safety of the data can be safeguarded, because the same data as on the master disk is stored on the preliminary disks.

On the other hand, in the case where a data stream is recorded while a data transfer speed is regarded as important, the data is recorded using a striping system which is a recording system according to the RAID3 or the RAID5 protocol.

FIG. 3 is a conceptual diagram of the RAID3 recording system in which the data is recorded using the striping system. In the striping system of the RAID3, a specific disk drive is used for storing parity data among a plurality of disk drives. For example, the disk drive 304 is used as the disk drive for storing the parity data. In this striping system, the disk drive 300 stores data 1, data 5, data 9, . . . , respectively, during the recording of a series of data items 306. The disk drive 301 stores data 2, data 6, data 10, . . . , respectively. The disk drive 302 stores data 3, data 7, data 11, . . . , respectively. The disk drive 303 stores data 4, data 8, data 12, respectively. The disk drive 304 stores parity data of the data 1 to 4, 5 to 8, and 9 to 12. Accordingly, since the series of data 306 can be recorded in parallel in the respective disk drives, a higher transfer speed can be achieved.

FIG. 4 is a conceptual diagram of the RAID5 recording system in which data is recorded using a different striping system. In the RAID5 striping system, the parity data is distributed and stored in a plurality of disk drives. In this striping system, the disk drives 400 to 403 store data 1 to 4, respectively, and the disk drive 404 stores parity data of the data 1 to 4. Next, the disk drives 400 to 402, and 404 store data 5 to 7, and 8, respectively, and the disk drive 403 records parity data of the data 5 to 8. Next, the disk drives 400, 401, 403, and 404 store data 9, 10, 11, and 12, and the disk drive 402 stores parity data of the data 9 to 12. Accordingly, since the series of data can be recorded in parallel in the respective disk drives, a higher transfer speed can be achieved.

In the RAID3 recording system (see FIG. 3), the parity data is stored in the disk drive 304 only. Therefore, the data cannot be simultaneously written by different disk drives. On the other hand, in the RAID5 recording system (see FIG. 4), the parity data are distributed and recorded in the respective disk drives. Therefore, the data can be simultaneously written by the different disk drives, and the whole performance can be improved.

In such a disk array system, the respective RAID1, RAID3, and RAID5 recording systems can be selected depending on the data to record, or user's desire. Therefore, in a case where a high data transfer speed is required as in the present image pickup device 1 whose recording object is the image data, the RAID3 or the RAID5 system may be adopted.

Figure 5:
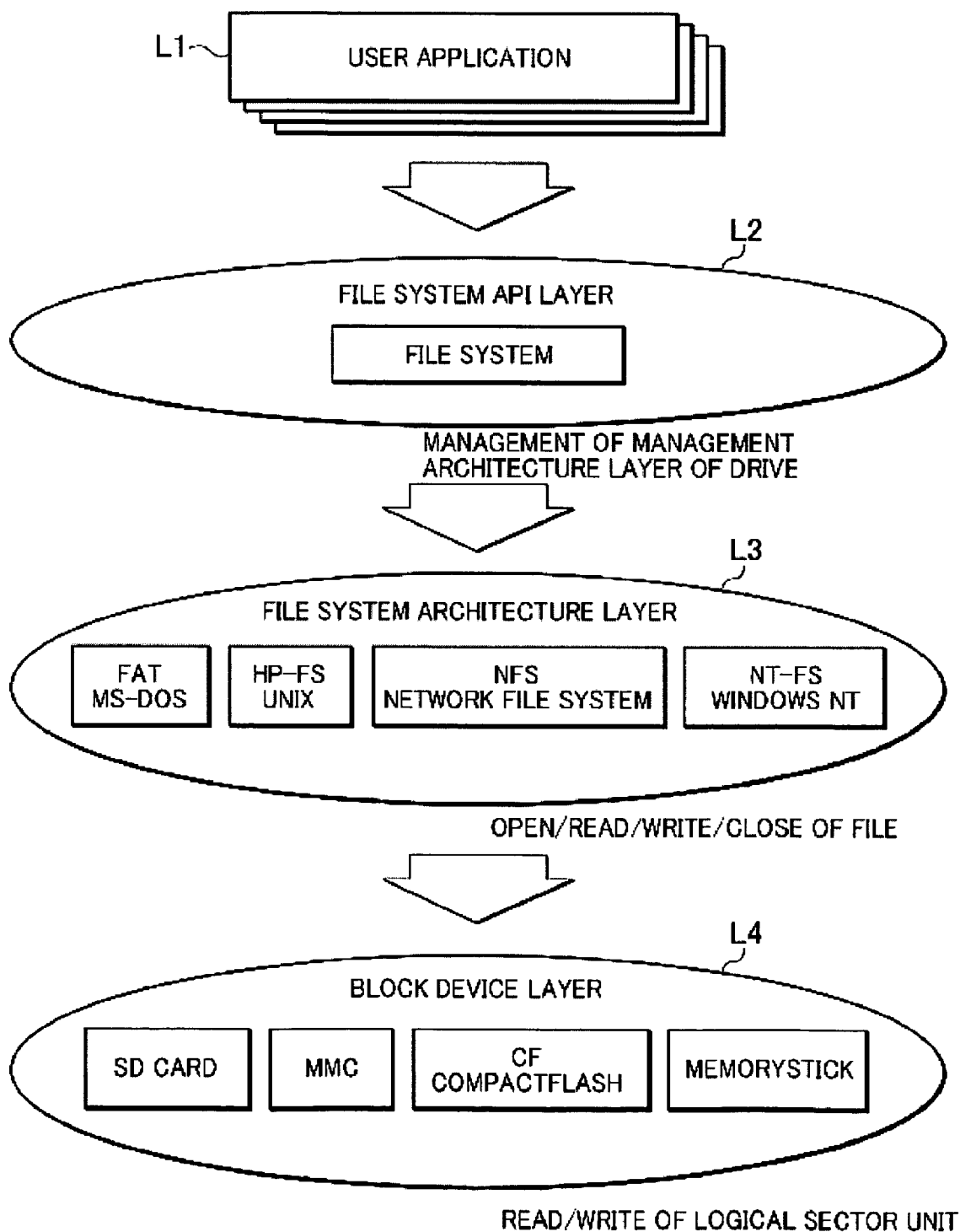
FIG. 5 is a conceptual diagram of a hierarchical structure of an image file system recorded in a recording medium.

FIG. 5 is a conceptual diagram showing a hierarchical structure of an image file system recorded in the recording medium SDC. The structure is constituted by, for example, layers L1 to L4.

In FIG. 5, the uppermost layer L1 is a user application. This user application is software which starts in the image pickup device 1. After a file is opened by a file name, and data is read or written, the file is closed.

The layer L2 is a file system application program interface (API) layer, and is called out from the user application by a function call. The layer L2 associates drive names with file systems to manage them. A file system architecture layer (layer L3) is mounted in each drive. Therefore, a plurality of file system architectures (e.g., file allocation table (FAT), net work file system (NFS), and NT file system (NTFS), etc.) can get mixed. It is to be noted that the file system architecture layer (layer L3) is a portion which performs actual file management. The lowermost layer L4 is a block device layer.

The file system architecture layer realizes file input and output by use of a service presented by the block device layer. It is to be noted that the block device layer manages the data in units of a sector of 512 bytes or the like. The block device layer absorbs a difference between the input and the output for each device, and a difference between parameters in a head, a cylinder or the like. In consequence, it is possible to construct a camera system mixed with a plurality of types of devices.

In the image pickup device 1 of the present embodiment, the following services (B. 1) to (B. 3) are presented to the file system from the recording medium SDC block device which is the external storage device.

(B. 1): Reading of data from a sector designated by a logical sector number;

(B. 2): Writing of data into a sector designated by a logical sector number; and (B. 3): Erasing of the sector designated by the logical sector number.

It is assumed that the external storage device for use can present at least the services (B. 1) and (B. 2) among the services (B. 1) to (B. 3).

It is further assumed that access locking is possible in the external storage device. In access locking, at least the services (B. 2) and (B. 3) are set to be unusable to thereby disable changing of internal data. Furthermore, in a system other than a system in which access locking is applied, the unlocking cannot be automatically performed unless there is an input or the like from a user. For example, there is access locking by password or the like.

The recording medium SDC satisfies the above conditions. In the present embodiment, there will be described an example in which as the recording medium, there is used a recording medium SDC having a password locking function for locking access by password, and a FAT file system is used as a file system architecture.

Next, there will be described the password locking function of the recording medium SDC. The password locking function disables all accesses involving data changes in the recording medium SDC. However, at least an access for password unlocking is possible. It is to be noted that only one password can be registered, and multiple locking is not supported.

The following password control services (C. 1) to (C. 6) are provided for card accesses relating to password control in the recording medium SDC.

Service (C. 1): The password is set by designating a new password in a case where no password has been set.

Service (C. 2): The password is changed by designating old and new passwords in a case where the password is already set.

Service (C. 3): In a case where a password is set, the password is deleted by designating the same new password.

Service (C. 4): In a case where the password is set, the password locking is executed by designating the same password.

Service (C. 5): In a case where the locking is applied by the password, password unlocking is executed by designating the same password. However, any password is not deleted by this operation.

Service (C. 6): In a case where the locking is applied by the password, forced password unlocking is executed by simultaneously performing the password unlocking and the deletion of all the data from the card without designating any password.

Figure 6:
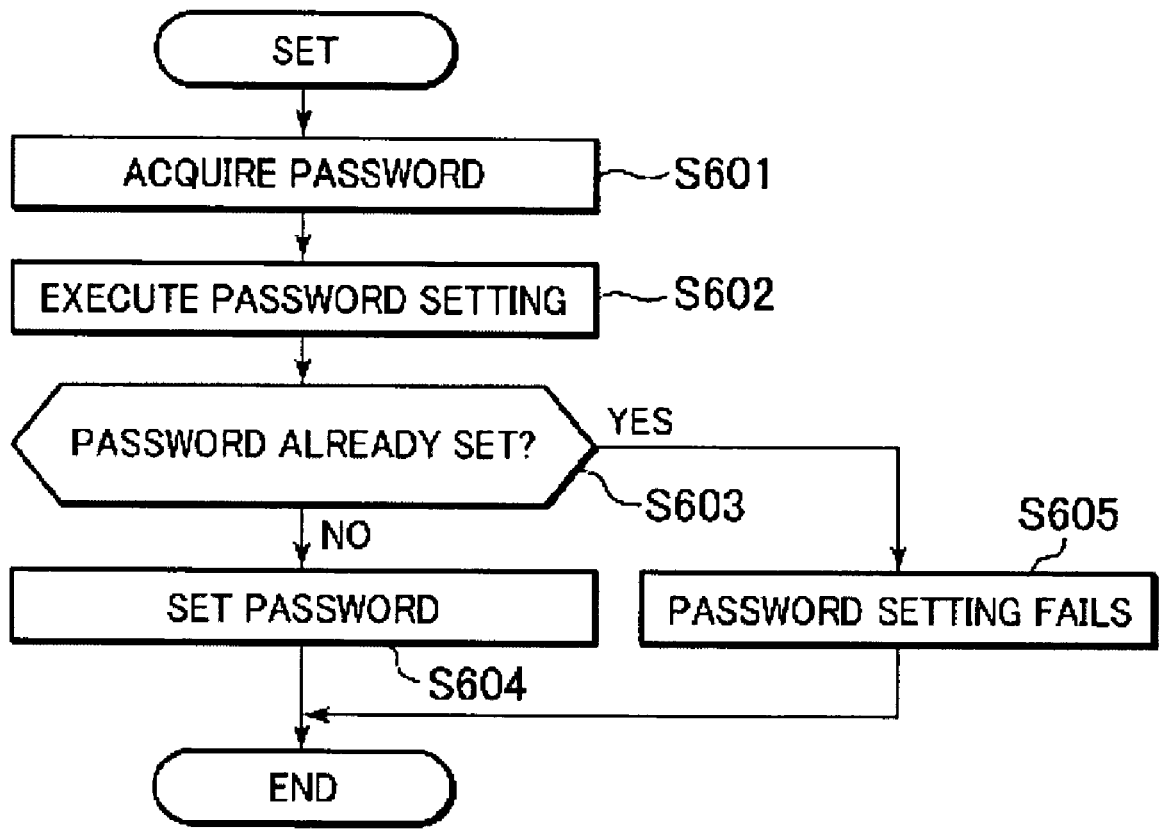
FIG. 6 is a flowchart showing an operation of a card access service (C. 1)

FIG. 6 is a flowchart showing an operation of the card access service (C. 1).

First, in the image pickup device 1 to which the recording medium SDC is attached, the system control unit 28 acquires the password (step S601). Examples of a method of acquiring the password includes a method of acquiring the password by user's input, and a method of automatically generating the password from card attribute information, an ID or the like, and either method may be adopted. Thereafter, it is assumed that the password is acquired by a similar method unless otherwise mentioned. Next, in step S602, the acquired password is set to the recording medium SDC. The subsequent processing of steps S603 to S605 is automatically executed by a controller (not shown) built in the recording medium SDC.

The recording medium SDC, which is a password setting object, judges whether or not the password has been already set in the medium itself (step S603). When the password has been already set, it is judged that the password setting fails (step S605), thereby ending the present processing. On the other hand, in a case where the password is not set yet, the password set this time is newly set (step S604), thereby ending the present processing. It is to be noted that the set password is stored in the memory 20 or the like.

Figure 7:
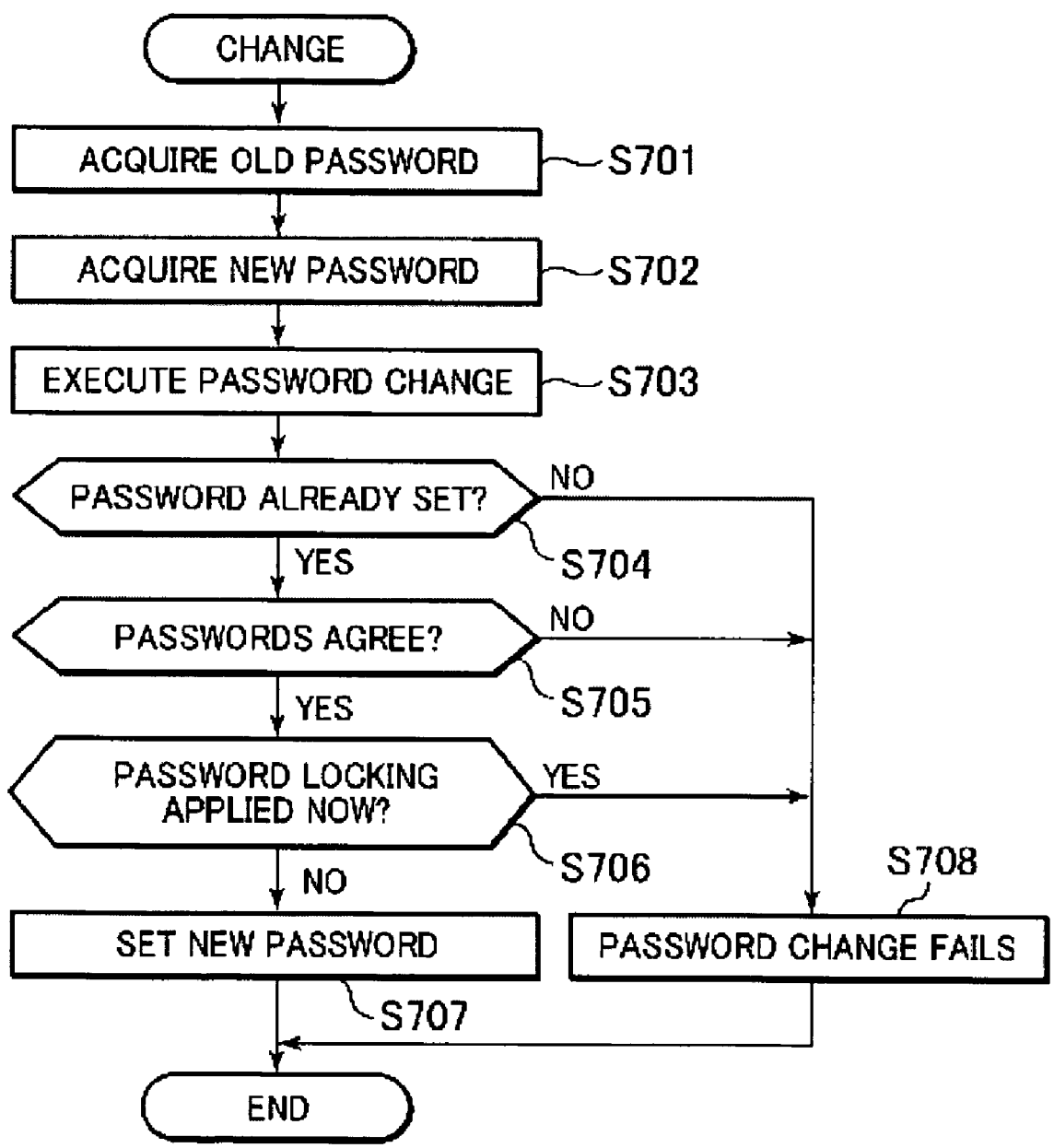
FIG. 7 is a flowchart showing an operation of a second card access service (C. 2)

FIG. 7 is a flowchart showing an operation of the card access service (C. 2). In the image pickup device 1 to which the recording medium SDC is attached, the system control unit 28 first acquires the presently set password (old password) in step S701. This old password is read from the memory 20, and acquired. Next, in step S702, a new password to be newly set is acquired. Further in step S703, password change is executed with respect to the recording medium SDC. The subsequent processing is automatically executed by the controller built in the recording medium SDC.

The recording medium SDC, which is an execution object of the password change, judges whether or not the password has been already set in the medium itself (step S704). Here, in a case where the password has been already set, it is judged whether or not the set password agrees with the acquired old password (step S705). As a result of the judgment, in a case where the passwords agree with each other, it is judged whether or not password locking is applied to the recording medium itself at this time (step S706). Here, in a case where the password locking is not applied, the new password is set instead of the acquired old password (step S707), thereby ending the present processing.

On the other hand, as a result of the judgment of the step S704, in a case where the password has not been set yet, it is judged that the password change fails (step S708), thereby ending the present processing. As a result of the judgment of the step S705, even in a case where the already set password does not agree with the acquired old password, the present processing ends. As a result of the judgment of the step S706, even in a case where the password locking is applied, the present processing ends.

Figure 8:
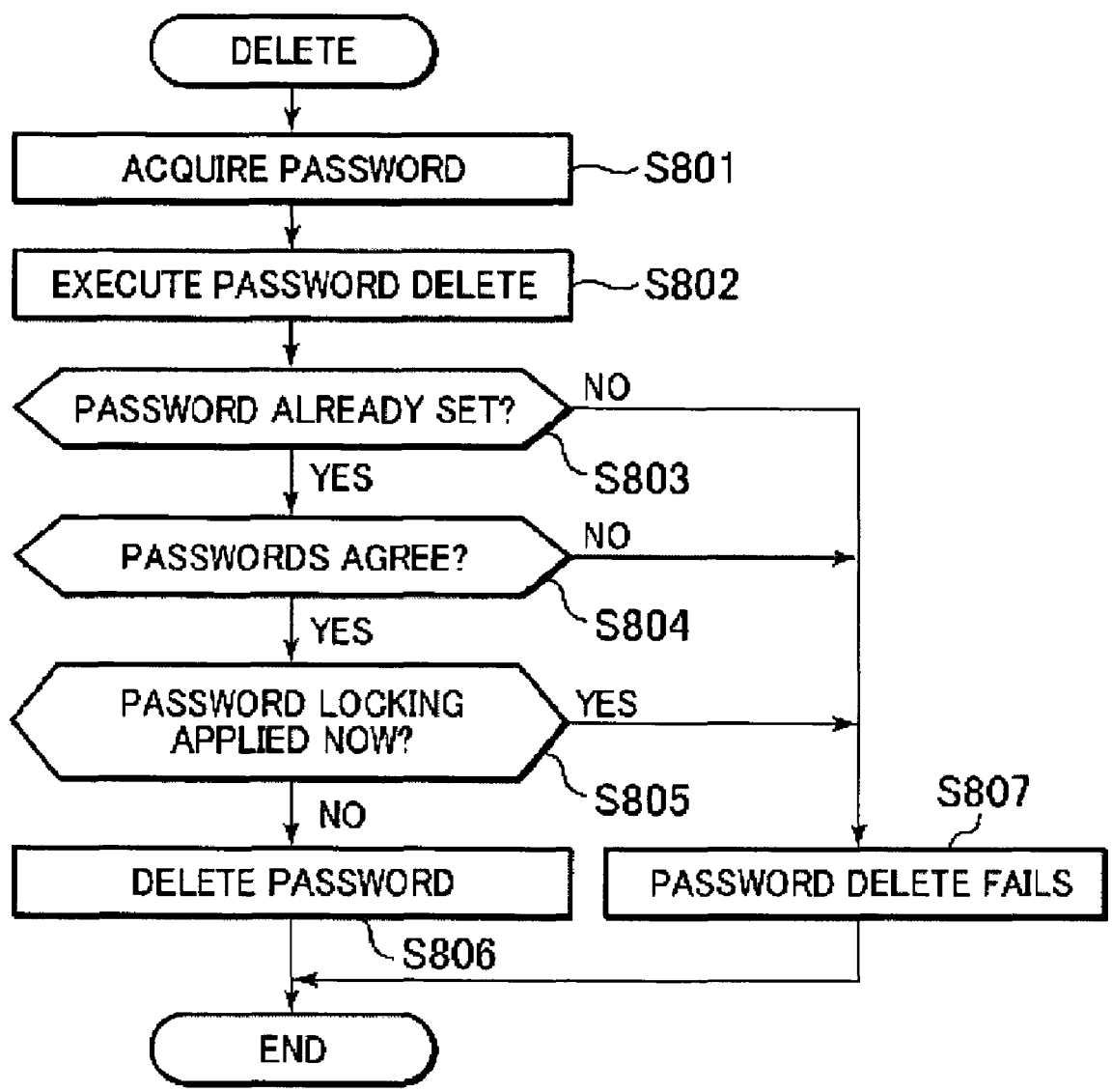
FIG. 8 is a flowchart showing an operation of a third card access service (C. 3)

FIG. 8 is a flowchart showing an operation of the card access service (C. 3). In the image pickup device 1 to which the recording medium SDC is attached, the system control unit 28 first acquires the password in step S801. This old password is read from the memory 20, and acquired. Next, in step S802, the password is deleted from the recording medium SDC. The subsequent processing is automatically executed by the controller built in the recording medium SDC.

The recording medium SDC, which is an execution object of the password deletion, judges whether or not the password has been already set in the medium itself (step S803). As a result of the judgment, where the password has been already set, it is judged in step S804 whether or not the set password agrees with the acquired password. As a result of the judgment, in a case where the passwords agree with each other, it is judged in step S805 whether or not the password locking is applied to the recording medium itself at this time. Moreover, in a case where the password locking is not applied, the password is deleted in step S806, thereby ending the present processing.

On the other hand, as a result of the judgment of the step S803, in a case where the password has not been set yet, it is judged that the password deletion fails (step S807), thereby ending the present processing. As a result of the judgment of the step S804, in a case where the set password does not agree with the acquired password, the present processing ends. As a result of the judgment of the step S805, in a case where the password locking is applied at this time, the present processing ends.

Figure 9:
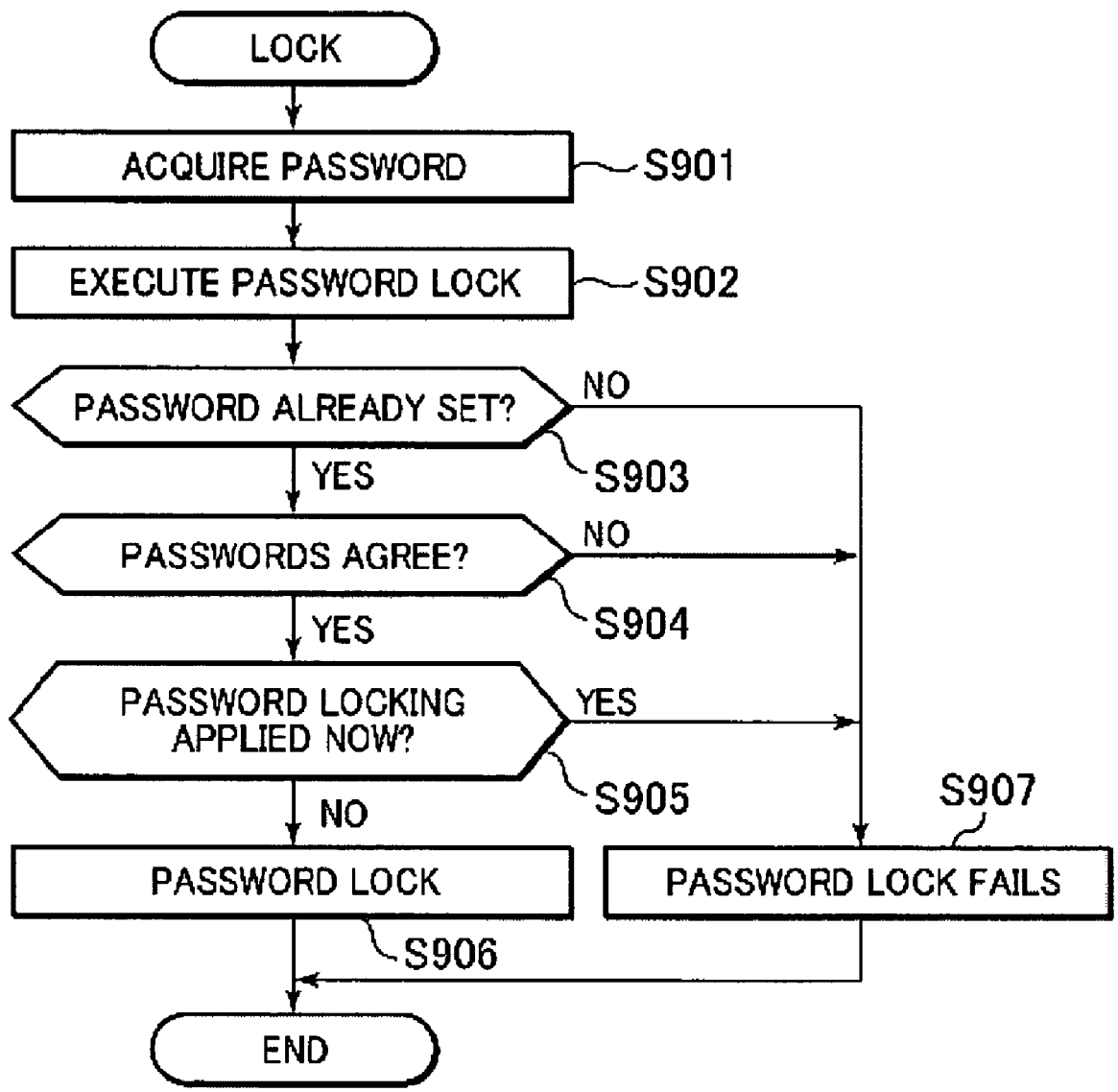
FIG. 9 is a flowchart showing an operation of a fourth card access service (C. 4)

FIG. 9 is a flowchart showing an operation of the card access service (C. 4). In the image pickup device 1 to which the recording medium SDC is attached, the system control unit 28 first acquires the password in step S901. Next, in step S902, password locking is executed with respect to the recording medium SDC. The subsequent processing is automatically executed by the controller built in the recording medium SDC.

The recording medium SDC, which is an execution object of the password locking, executes processing similar to that of the steps S803 to S805 of FIG. 8 in steps S903 to S905. As a result of the judgment of the step S905, in a case where the password locking is not applied, the medium itself is password-locked, thereby ending the present processing.

On the other hand, as a result of the judgment of the step S903, in a case where the password is not set, it is judged that the password locking fails (or the locking is already set) (step S907), thereby ending the present processing. As a result of the judgment of the step S904, in a case where the already set password does not agree with the acquired password, the present processing ends. As a result of the judgment of the step S905, in a case where the medium itself is password-locked, the present processing ends.

Figure 10:
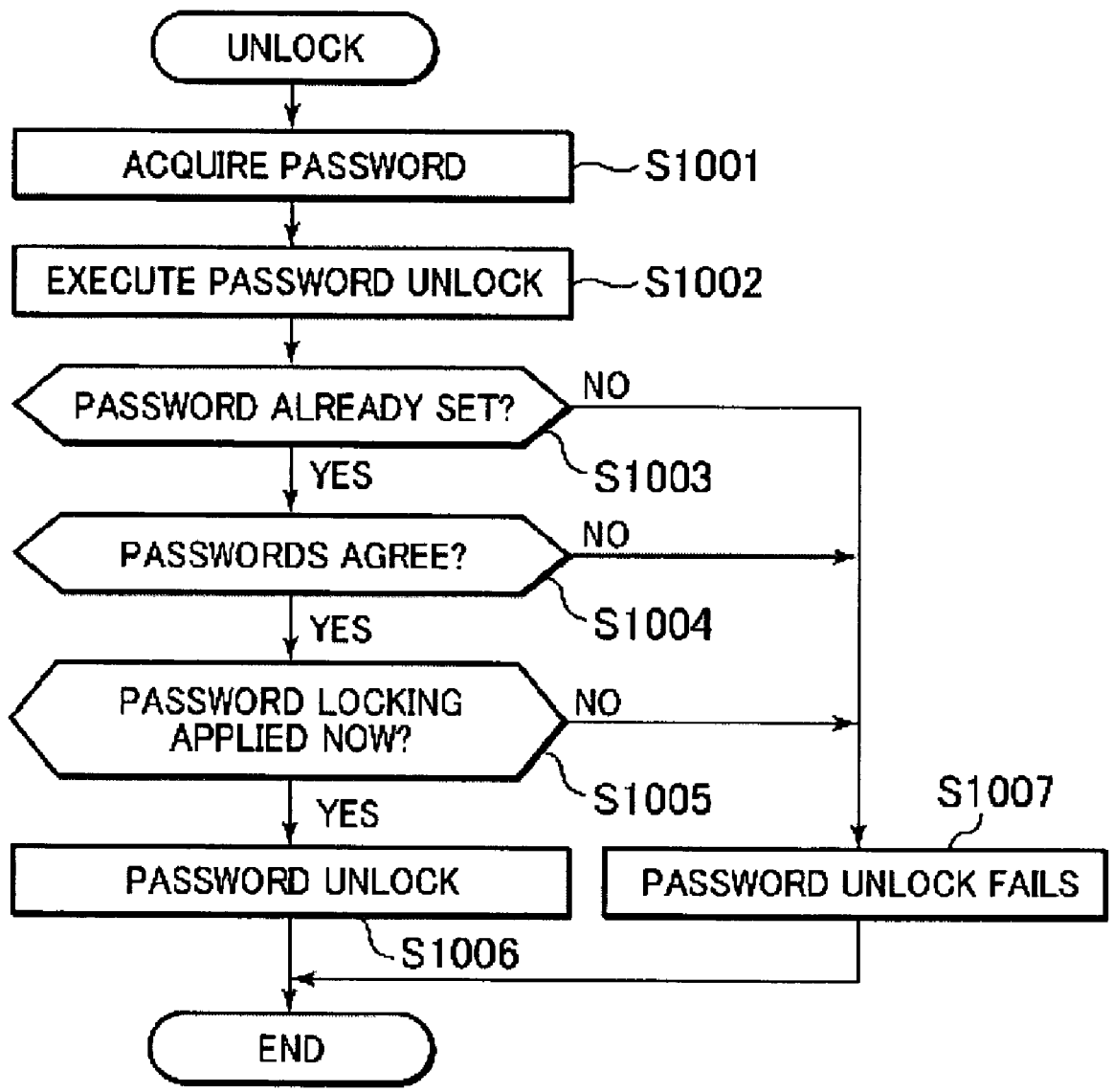
FIG. 10 is a flowchart showing an operation of a fifth card access service (C. 5)

FIG. 10 is a flowchart showing an operation of the card access service (C. 5). In the image pickup device 1 to which the recording medium SDC is attached, the system control unit 28 first acquires the password in step S1001. Next, in step S1002, password unlocking is executed with respect to the recording medium SDC. The subsequent processing is automatically executed by the controller built in the recording medium SDC.

The recording medium SDC, which is an execution object of the password unlocking, executes processing similar to that of the steps S803 to S805 of FIG. 8 in steps S1003 to S1005. As a result of the judgment of the step S1005, in a case where the password locking is not applied, the password locking is cancelled, thereby ending the present processing.

As a result of the judgment of the step S1003, in a case where the password is not set, it is judged that the password unlocking fails (or the password unlocking is already set) (step S1007), thereby ending the present processing. As a result of the judgment of the step S1004, in a case where the set password does not agree with the acquired password, the present processing ends. As a result of the judgment of the step S1005, in a case where the password locking is not applied, the present processing ends.

Figure 11:
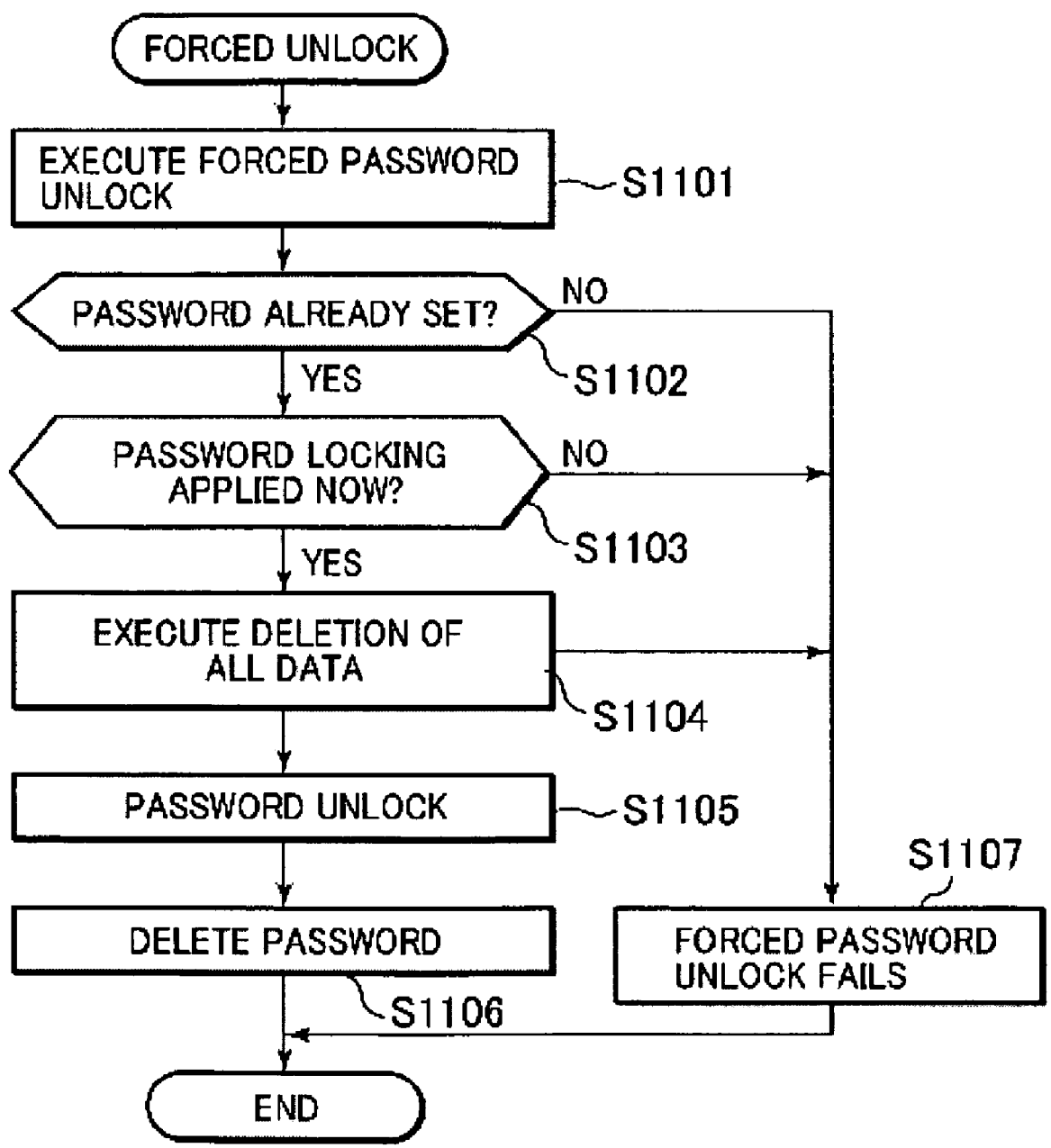
FIG. 11 is a flowchart showing an operation of a sixth card access service (C. 6)

FIG. 11 is a flowchart showing an operation of the card access service (C. 6). In the image pickup device 1 to which the recording medium SDC is attached, the system control unit 28 first executes forced password unlocking with respect to the recording medium SDC in step S1101. The subsequent processing is automatically executed by the controller built in the recording medium SDC.

The recording medium SDC, which is an execution object of the forced password unlocking, judges whether or not the password is set to itself at this time (step S1102). Here, in a case where the password is already set, it is judged in step S1103 whether or not the password locking is applied at present. As a result of the judgment, in a case where the password locking is applied, all data is deleted from itself (step S1104). Moreover, when the deletion of all the data is completed, its password locking is cancelled (step S1105). Furthermore, the password is deleted (step S1106), thereby ending the present processing.

On the other hand, as a result of the judgment of the step S1102, in a case where the password is not set, it is judged that the forced password unlocking fails (step S1107), thereby ending the present processing. As a result of the judgment of the step S1103, even in a case where the password locking is not applied, the present processing ends.

Next, the password control service will be described. The password control services (C. 1) to (C. 6) of the recording medium SDC are performed by transmitting a command and subsequent password control data to the recording medium SDC under a control of the system control unit 28.

Figure 12:
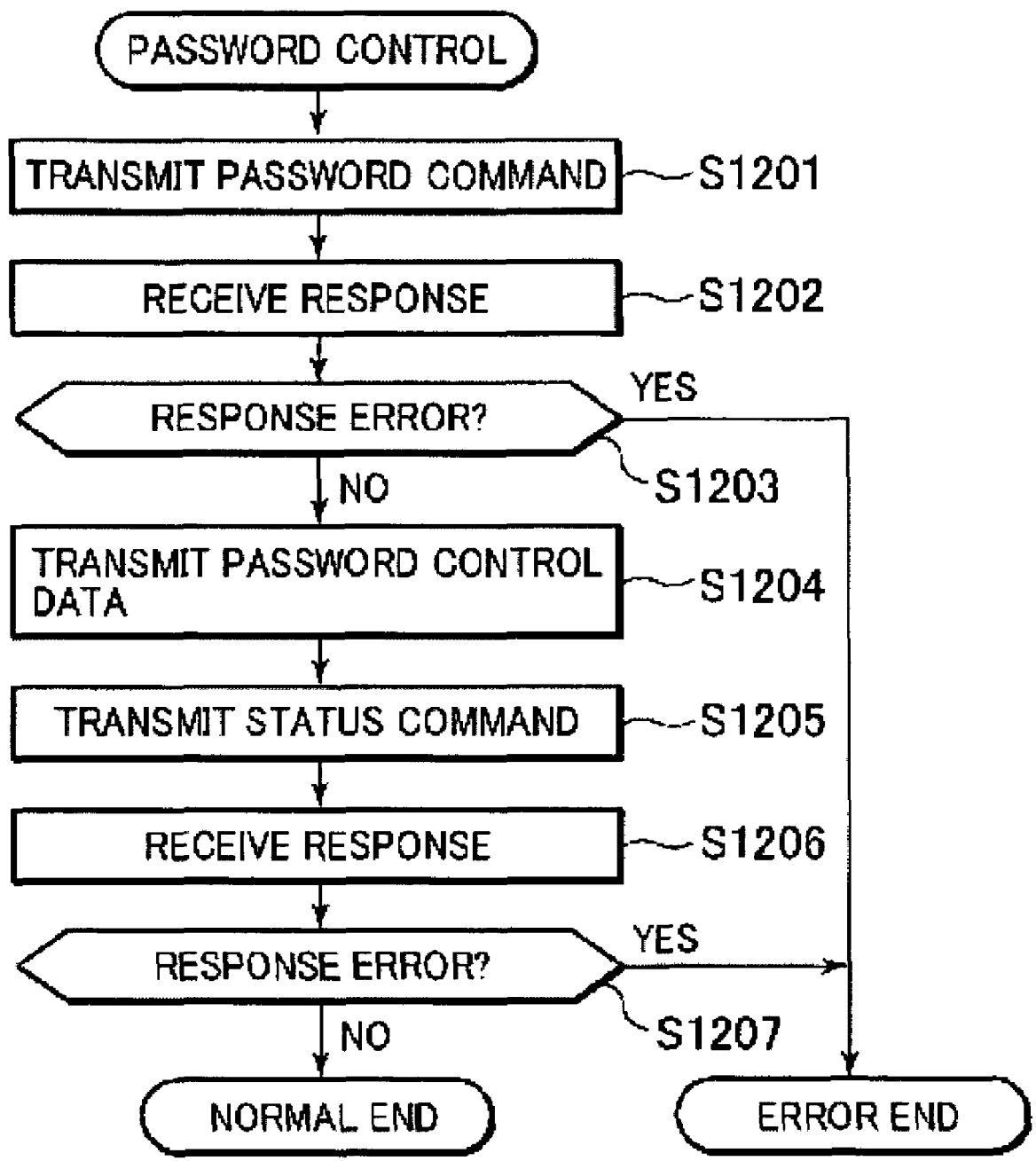
FIG. 12 is a flowchart of a password control with respect to the recording medium.
Figure 13:
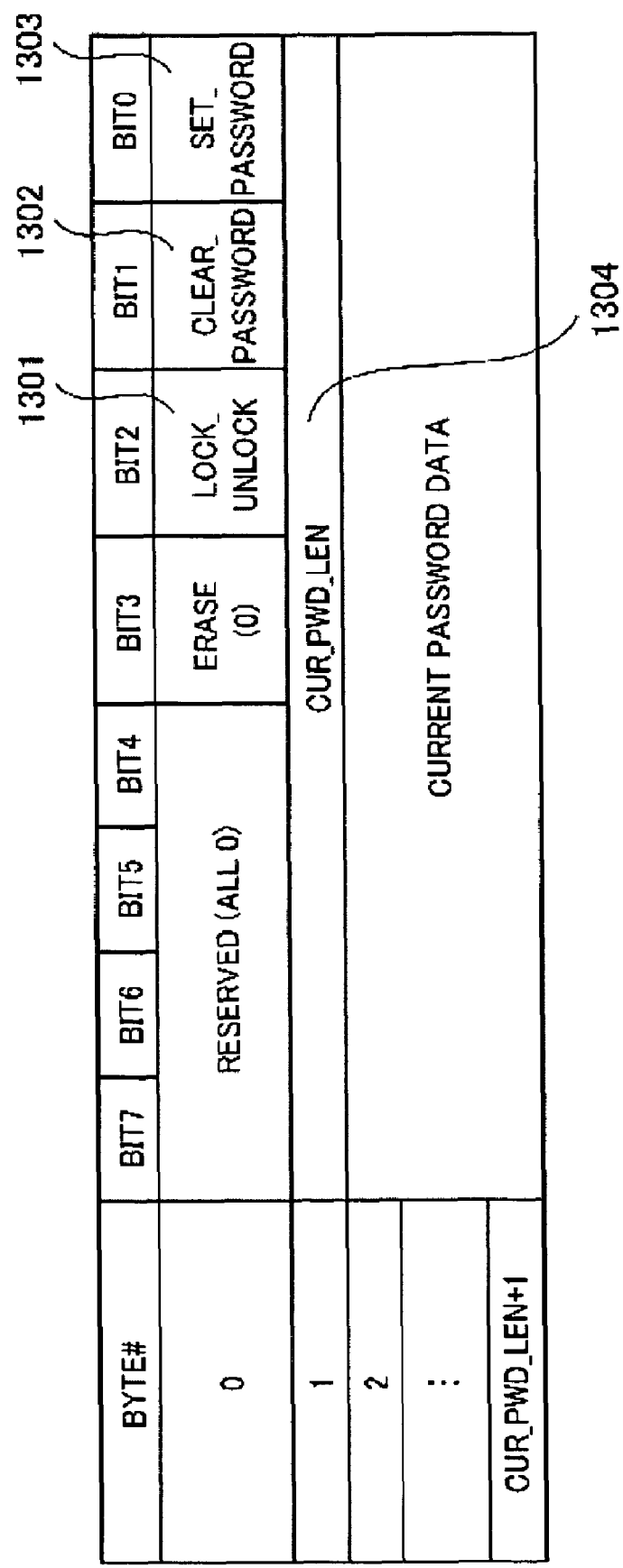
FIG. 13 is a conceptual diagram showing a structure of password control data in password control services (C. 1), and (C. 3) to (C. 5)
Figure 14:
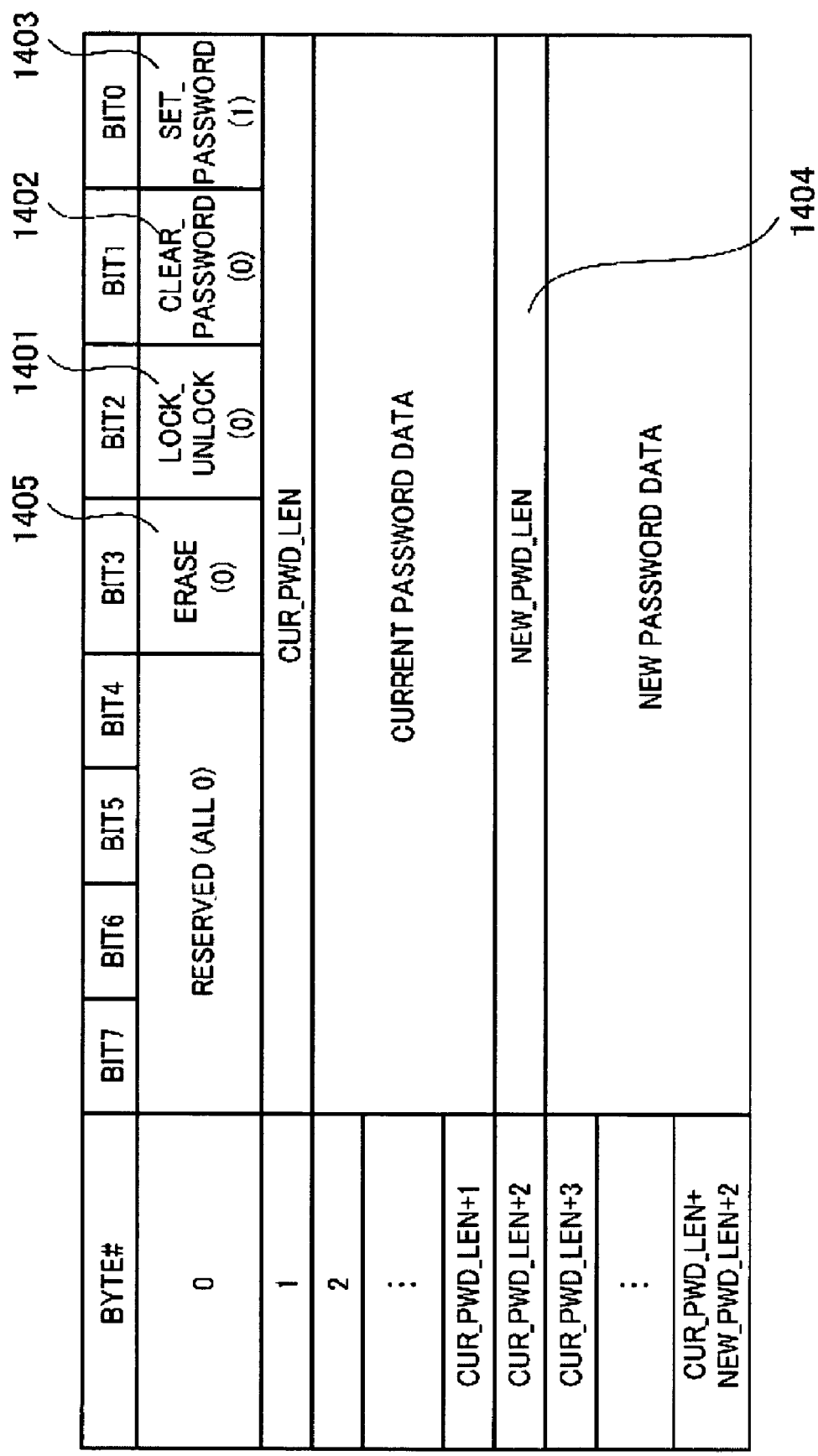
FIG. 14 is a conceptual diagram showing a structure of password control data in a password control service (C. 2)

FIG. 12 is a flowchart of the password control with respect to the recording medium SDC. FIG. 13 is a conceptual diagram showing a structure of the password control data in the password control services (C. 1), and (C. 3) to (C. 5). FIG. 14 is a conceptual diagram showing a structure of the password control data in the password control service (C. 2). FIG. 15 is a conceptual diagram showing a structure of the password control data in the password control service (C. 6).

First, there will be described the structure of the password control data. In FIGS. 13 to 15, each row indicates data for one byte. Numbers starting with 0 are assigned to byte numbers (Byte #) and bit (Bit0 to Bit7) numbers in each byte. A numeral (0 or 1) within parentheses indicates a specific numerical value (bit value).

In FIG. 13, LOCK_UNLOCK 1301 (Byte0:Bit2) is a bit indicating whether or not to perform the password locking, the bit value "1" indicates the password locking, and "0" indicates the unlocking. In the password control service (C. 4), "1" is put into the bit, and 0 is put in another control. CLEAR_PASSWORD 1302 (Byte0:Bit1) is a bit indicating whether or not to delete the password, and the bit value "1" indicates the password deletion. In the password control service (C. 3), "1" is put into the bit, and "0" is put in another control.

SET_PASSWORD 1303 (Byte0:Bit0) is a bit indicating whether or not to set the password, and the bit value "1" indicates the password setting. In the password control service (C. 1), "1" is put into the bit, and "0" is put in another control. In CUR_PWD_LEN (Byte1) 1304, a length of the password is put in terms of the byte number, and a password main body is put in and after the second byte.

In FIG. 14, numerical values within parentheses (1, 0, 0, 0) are put in SET_PASSWORD 1403, CLEAR_PASSWORD 1402, LOCK_UNLOCK 1401, and ERASE 1405. In CUR_PWD_LEN (Byte1) 1404, a length of the currently set password is put in terms of the byte number, and the current password main body is put in and after the second byte. Furthermore, a length of the password to be newly set is put in terms of the byte number in the (CUR_PWD_LEN+2)-th byte, and the password main body to be newly set is put from (CUR_PWD_LEN+3)-th byte.

In FIG. 15, ERASE 1505 (Byte0:Bit3) is a bit indicating the forced password unlocking, and the bit value "1" indicates forced unlocking execution. In the password control service (C. 6), "1" is put in the bit. In the drawing, numerical values within parentheses (0, 0, 0) are put in SET_PASSWORD 1503, CLEAR_PASSWORD 1502, and LOCK_UNLOCK 1501.

Next, there will be described password control processing with reference to FIG. 12. In the image pickup device 1 to which the recording medium SDC is attached, the system control unit 28 first transmits a command for password control to the attached recording medium SDC in step S1201, and the unit receives a response to the command in step S1202. Next, it is judged in step S1203 whether or not a response error has been generated. As a result of the judgment, in a case where the response error is not generated, the password control data is transmitted in step S1204.

Thereafter, a status command is transmitted in step S1205, and a response to the command is received in step S1206. The response includes a status indicating whether or not the password control has become successful. In the subsequent step S1207, it is judged whether or not the password control becomes successful depending on whether or not there has been the response error.

As a result of the judgment, in a case where there is not any response error, it is judged that the password control is normally successful, and the processing normally ends. On the other hand, as a result of the judgment of the step S1203 or S1207, in a case where there is the response error, it is judged that the password control is not normally successful, and the processing ends owing to an error.

Additionally, since a card access relating to the password control of the recording medium SDC is synchronously processed, the password is not changed or deleted in a case where the password locking is applied. There is a case where power supply is sometimes started with respect to the recording medium SDC in which the password is set. Examples of the case includes a case where the recording medium SDC is attached to the image pickup device 1 when the power supply is turned off. For such case, the recording medium SDC is provided with an "automatic password locking function" in which the password locking is automatically applied to the recording medium SDC.

Figure 16:
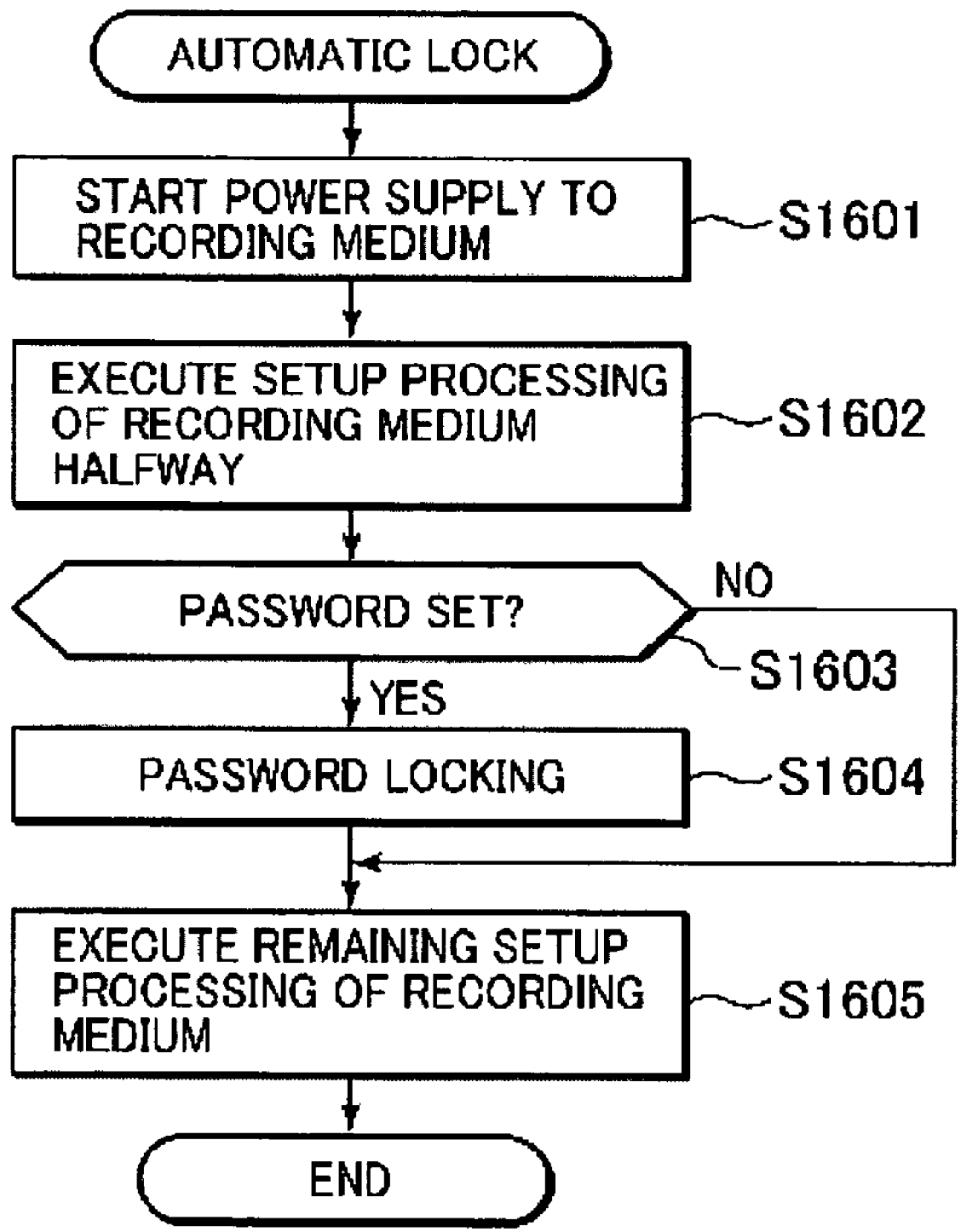
FIG. 16 is a flowchart of automatic password locking function processing.

FIG. 16 is a flowchart of automatic password locking function processing. In the image pickup device 1 to which the recording medium SDC is attached, the system control unit 28 first supplies power to the attached recording medium SDC in step S1601.

Next, in step S1602, the recording medium SDC which has received power executes its setup processing halfway. At this time, the recording medium SDC does not start acceptance of an initialization command. Next, in step S1603, the recording medium SDC judges whether or not the password is set in the medium itself. As a result of the judgment, in a case where any password is not set, the remaining setup processing is executed in step S1605, thereby ending the present processing. On the other hand, as a result of the judgment of the step S1603, in a case where the password is set, the password locking is applied by itself in step S1604, and the step S1605 is executed. The execution of the step S1605 starts the acceptance of the initialization command.

According to the present processing, in a case where the recording medium SDC to which the password has been set is inserted into the image pickup device 1, and power is supplied to the device, the medium is automatically brought into a password-locked state. This also applies to a case where the medium is inserted into another image pickup device.

FIG. 17 is a diagram showing set states of the password and the password locking of the recording medium SDC in a case where the card access services (C. 1) to (C. 6) were executed successfully.

As shown in the drawing, after the services (C. 1) to (C. 6) have been successfully executed, no other service is executed, and the power supply is removed. Thereafter, when the power is supplied again, the following state is brought about. That is, after the services (C. 1), (C. 2), (C. 4), and (C. 5) become successful, a password setting state is "set", and a password locking setting state is "locked". After the services (C. 3) and (C. 6) have been performed, the password setting state is "non-set", and the password locking setting state is "unlocked".

Figure 18:
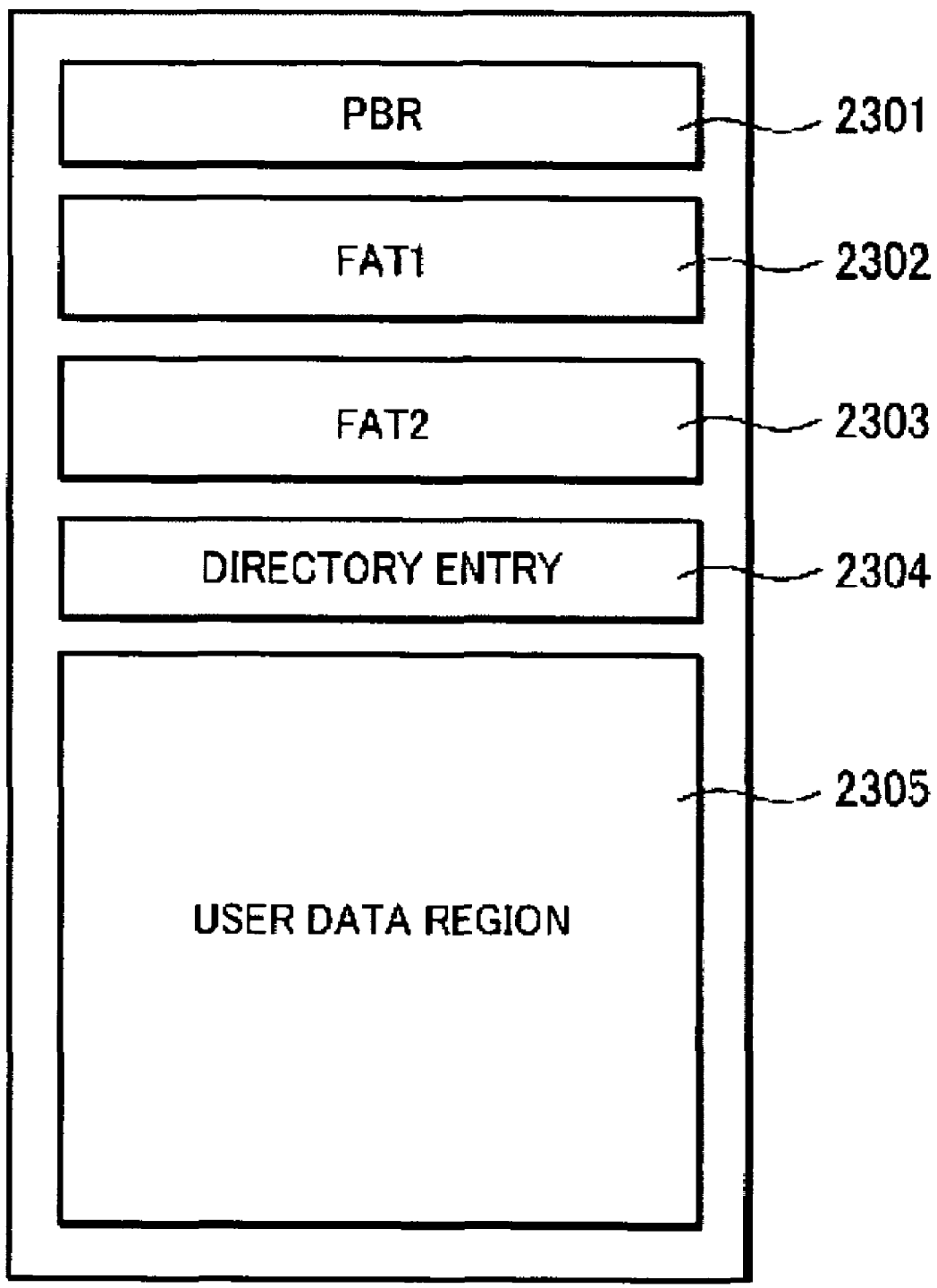
FIG. 18 is a diagram showing a structure of a storage region of the recording medium formatted in a file allocation table (FAT) file system.

Next, there will be described a file access in the file allocation table (FAT) file system. FIG. 18 is a display showing a structure of a storage region of the formatted recording medium SDC in the FAT file system. As shown in the drawing, the storage region includes a partition boot record (PBR) 2301, a first FAT (FAT1) 2302, a second FAT (FAT2) 2303, a directory entry 2304, and a user data region 2305.

Figure 19:
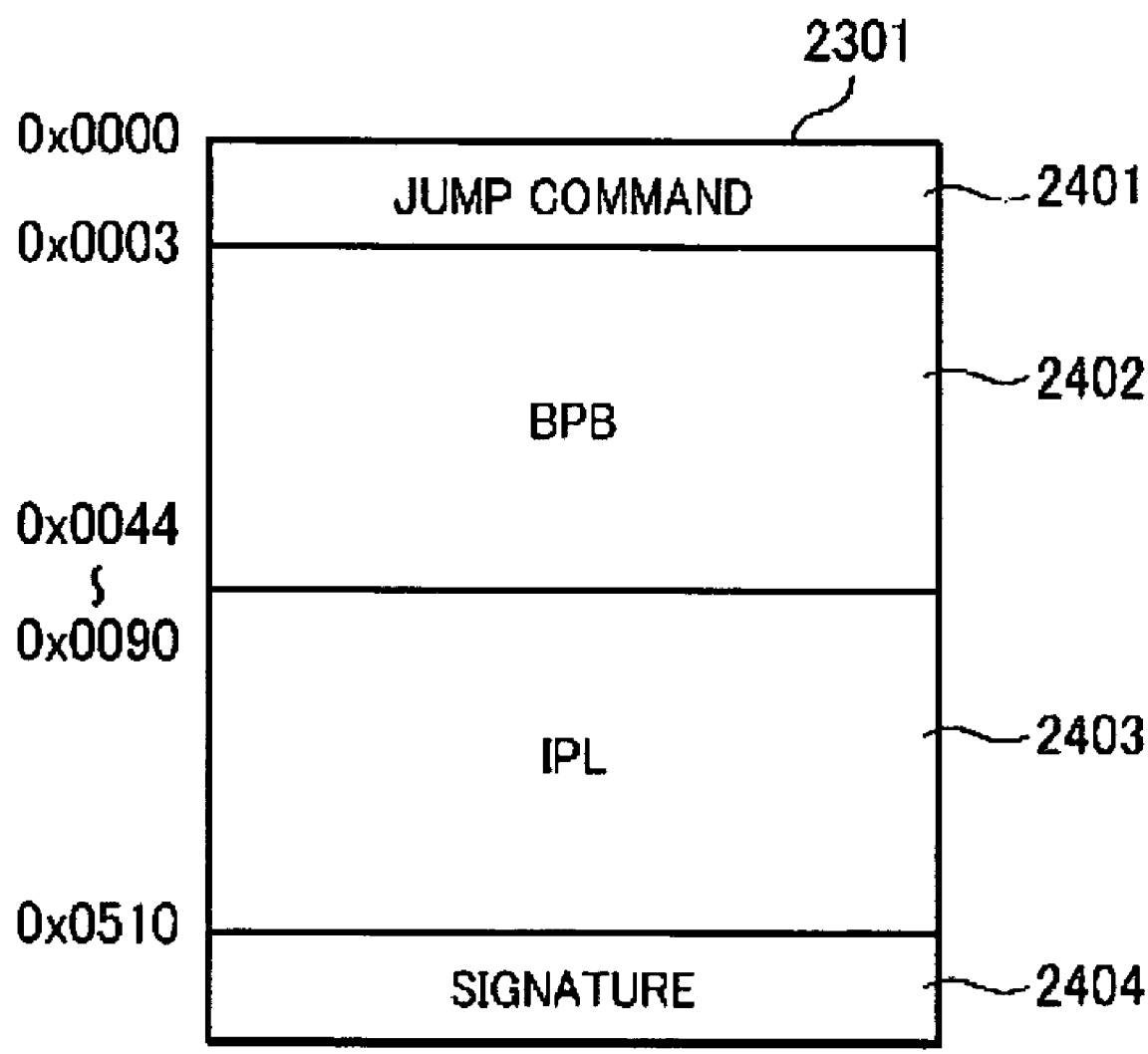
FIG. 19 is a diagram showing a detailed structure of a partition boot record (PBR)

FIG. 19 is a diagram showing a detailed structure of the PBR 2301. The PBR 2301 includes a jump command 2401, a BIOS parameter block (BPB) 2402, an initial program loader (IPL) 2403, and a signature 2404. In the jump command 2401, a jump command to the IPL 2403 is stored. In the IPL 2403, a partition start program is stored. In the BPB 2402, information on the file system, especially the information specific to this partition is recorded. FIG. 20 shows parameters included in the BPB 2402.

In the first FAT 2302 and the second FAT 2303 shown in FIG. 18, position information of the file stored in the user data region 2305 is stored. In the FAT file system, the position information of the file stored in the partition is acquired from the first and second FATs 2302, 2303. Therefore, even in a case where the file is stored in the user data region 2305, unless the position information of the file is stored in the first and second FATs 2302, 2303, the file cannot be identified. In the directory entry 2304, management information of the file stored in a root directory is stored. In the user data region 2305, the file main body is stored.

At least file access services (a) to (g) exist as follows in the file access with respect to the FAT file system:

(a): File preparation service to prepare a new empty file. The prepared file is brought into an open state.

(b): File deletion service to delete an already existing file.

(c): File open service to open an already existing file. A top of the file is recognized at a time when the file is opened.

(d): File close service to close the opened file.

(e): File read service to read file contents up to a designated size from a place recognized at that time in the opened file.

(f): File write service to write designated data up to the designated size from the place recognized at that time in the opened file. When the place recognized at that time is not a terminal end of the file, the data is overwritten on the current file contents.

(g): File seek service to move the place to be recognized in the open file. A relative position from the currently recognized place, an absolute position of the top or the like of the file or the like can be designated to move the place to be recognized.

In the FAT file system, in a case where the above file access services (a) to (g) are utilized, the file access by the service is decomposed into services (B. 1) to (B. 3) presented by the lowermost block device layer (layer L4) (see FIG. 5). Moreover, the FAT file system issues file data as a command to the block device layer to thereby store the data in the recording medium SDC.

For example, it is assumed that file storage processing to store the file data is executed in the recording medium SDC. In this case, there is performed a FAT write access which is an operation of writing the file position information into the first and second FATs 2302, 2303. A file write access is also performed which is an operation of writing the file contents data into the user data region 2305. At this time, the FAT write access is decomposed into at least one service (B. 2). The file write access is decomposed into at least one service (B. 2), and issued as a command to the block device layer. On receiving the command, the block device layer accesses the data of the recording medium SDC.

The FAT file system stores the file as the data in the recording medium SDC by the above-described method. The file cannot be recognized by the FAT file system until there is executed a service group including at least two or more services (B. 2) issued to the block device layer in the above file storage processing.

There will be described hereinafter processing to access the data in the RAID recording system using a plurality of recording media (SDC in the present embodiment).

Figure 21:
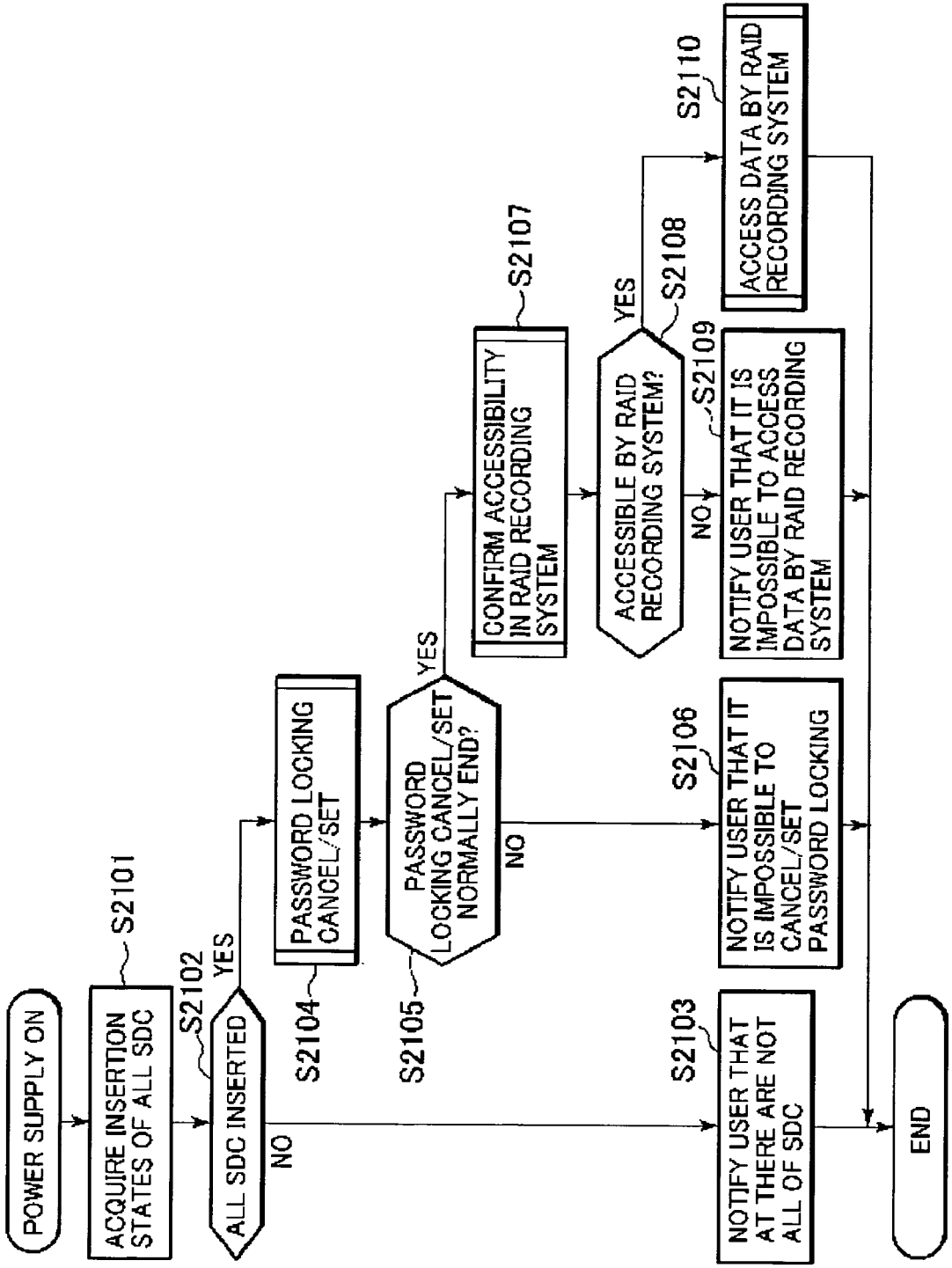
FIG. 21 is a flowchart of main processing of an RAID access.

FIG. 21 is a flowchart of main processing of RAID access in the present embodiment. When the power supply to the image pickup device 1 is turned ON, the present processing is executed by the system control unit 28.

First in step S2101, there is acquired an insertion state of the recording medium SDC with respect to each card I/F 24.

Next, it is judged in step S2102 whether or not the recording media SDC have been inserted into all the card I/Fs 24. As a result of the judgment, when the recording medium SDC is not inserted into any of the card I/Fs 24, a user is notified that there is not all of recording medium SDC to be inserted in step S2103. Examples of a notifying method include a method in which the notification is displayed in the image display unit 18 using a graphical user interface (GUI) or the like.

On the other hand, in a case where all the recording media SDC are inserted, password locking cancel/set processing of FIG. 22 described later is executed with respect to the inserted recording media SDC in step S2104. Next, it is judged in step S2105 whether or not the password locking cancel/set processing ends normally in the step S2104. As a result of the judgment, in a case where the processing does not end normally, it is notified to the user by use of the GUI or the like that the processing does not end normally in step S2106.

On the other hand, as a result of the judgment of the step S2105, in a case where the password locking cancel/set processing ends normally, the processing advances to step S2107. Moreover, there is executed accessibility confirmation processing described later with reference to FIG. 23 to confirm whether or not the data of the inserted recording medium SDC is accessible by the RAID recording system. Moreover, it is judged based on the result whether or not the data of the recording medium SDC is accessible by the RAID recording system (step S2108).

As a result of the judgment, in a case where the data is not accessible by the RAID recording system, the processing advances to step S2109 to notify the user by use of the GUI or the like that the data cannot be accessed by the RAID recording system. On the other hand, when the data can be accessed by the RAID recording system, in step S2110, the data of the recording medium SDC is accessed by the RAID recording system, and data such as a photographed image is stored in the recording medium SDC by the RAID recording system. It is assumed that the RAID3 is adopted as an example in the present embodiment.

Figure 22:
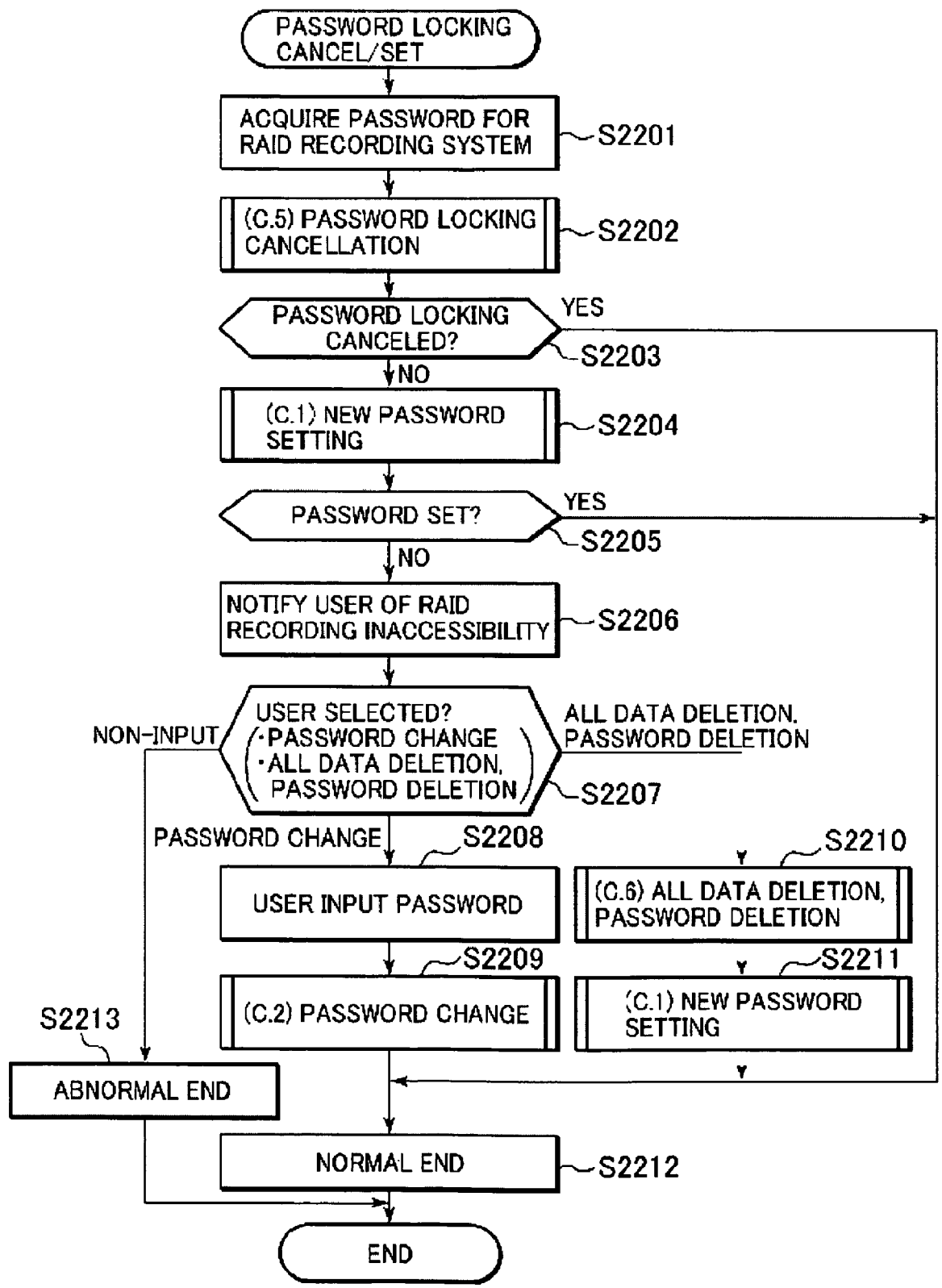
FIG. 22 is a flowchart of password unlocking and setting processing executed in step S2104 of FIG. 21.

FIG. 22 is a flowchart of the password locking cancel/set processing executed in the step S2104 of FIG. 21. In this processing, the password is set, and the password locking is canceled with respect to all the inserted recording media SDC.

First, in step S2201, there is acquired the password prepared beforehand for the RAID recording system. This password is, for example, input by the user, or automatically prepared as described above. The password may be the same with respect to all the recording media SDC (here, five media as many as the card I/Fs 24), but different passwords are prepared for the respective recording media SDC in the present embodiment. Therefore, five passwords are prepared in the present embodiment.

Next in step S2202, password unlocking by the above service (C. 5) is executed using the password for the RAID recording system. Next, it is judged in step S2203 whether or not the password unlocking can be performed. Here, when the password is set to the inserted recording medium SDC by use of the password for the RAID recording system in the image pickup device 1, and a password-locked state is achieved, cancellation of the password locking is possible. As a result of the judgment of the step S2203, in a case where the password locking can be cancelled, the processing advances to step S2212, and the password locking cancel/set processing ends normally, thereby ending the present processing.

On the other hand, in a case where the password locking cannot be cancelled, in step S2204, the new password setting by the above service (C. 1) is executed using the password for the RAID recording system. Next, it is judged in step S2205 whether or not the new password can be set. Here, when any password is not set to the inserted recording medium SDC, the new password can be set. As a result of the judgment of the step S2205, in a case where the new password can be set, the step S2212 is executed.

On the other hand, in a case where the new password cannot be set, the processing advances to step S2206, and the user is notified using the GUI or the like that the recording medium SDC cannot be accessed by the RAID recording system.

To set the recording medium SDC that cannot be accessed by the RAID recording system to be accessible by the RAID recording system, the password of the recording medium SDC is changed, or all the recorded data and passwords need to be forcibly deleted. In the subsequent step S2207, by use of the GUI or the like, there is displayed a selection menu for allowing the user to select either "password change" or "forced deletion of all data and passwords".

Moreover, when the "password change" is selected, the processing advances to step S2208, and the user is allowed to input a desired password by use of the GUI or the like. Moreover, in step S2209, the password change by the service (C. 2) is executed by use of the input password and the password for the RAID recording system, and the step S2212 is executed. Consequently, even in a case where the inserted recording medium SDC is not the recording medium SDC combined for the RAID recording, the medium can be used for the RAID recording.

On the other hand, when the "forced deletion of all data and passwords" is selected, the processing advances to step S2210, and the forced deletion of all the data and passwords by the above service (C. 6) is executed. Accordingly, the recording medium SDC is brought into a password non-set state (see FIG. 17). Thereafter, in step S2211, the new password setting by the above service (C. 1) is executed using the password for the RAID recording system, and the step S2212 is executed. Accordingly, even in a case where the inserted recording medium SDC is not the recording medium SDC combined for the RAID recording, the new password is set, and the medium can be used for the RAID recording.

Moreover, in a case where neither the password change or the forced deletion of all the data and passwords is selected in the step S2207, the processing advances to step S2213. That is, since either the cancellation of the password locking or the changing of the password cannot be performed, the password locking cancel/set processing abnormally ends, thereby ending the present processing.

Figure 23:
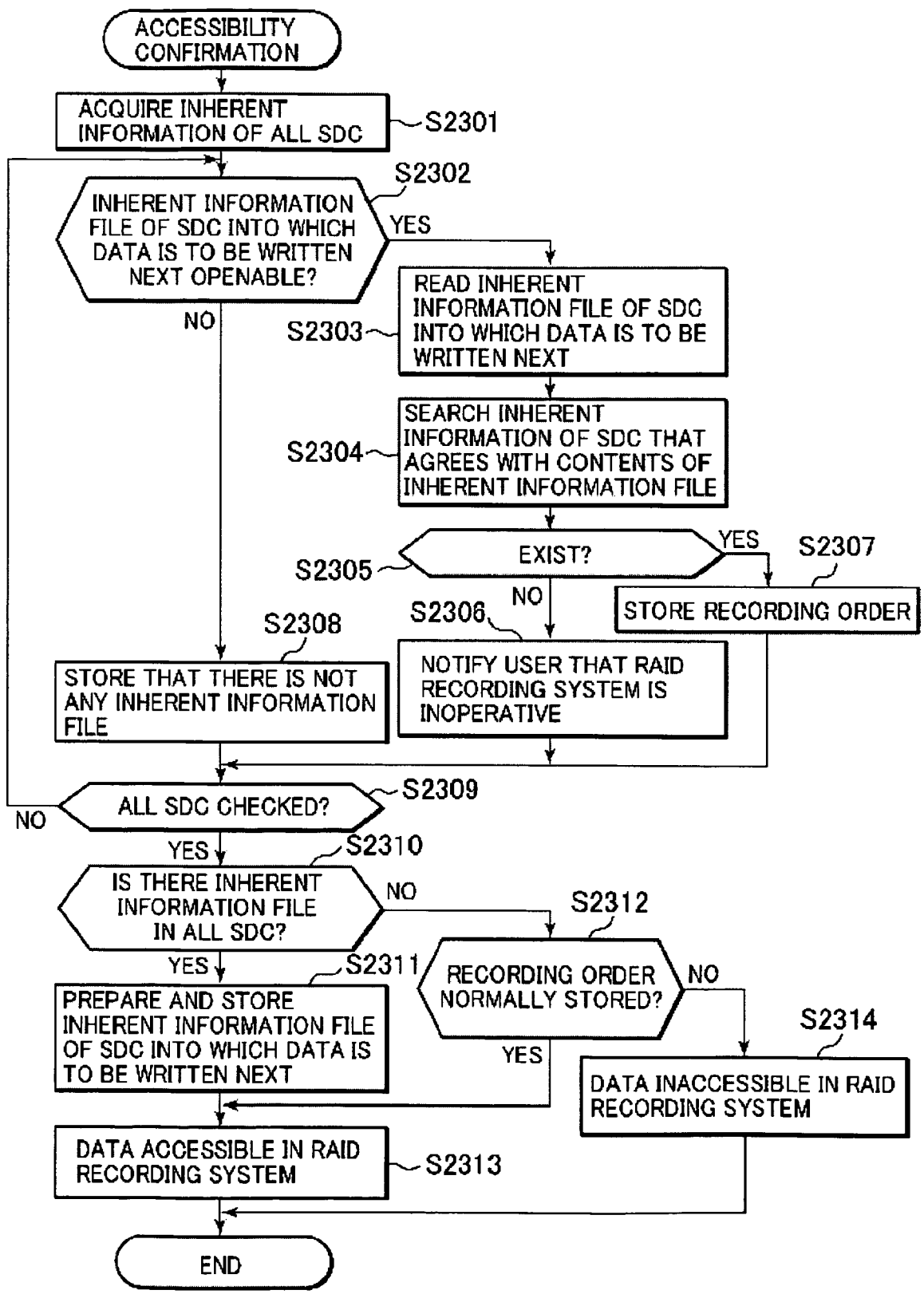
FIG. 23 is a flowchart of an accessibility confirmation processing executed in step S2107 of FIG. 21.
Figure 24:
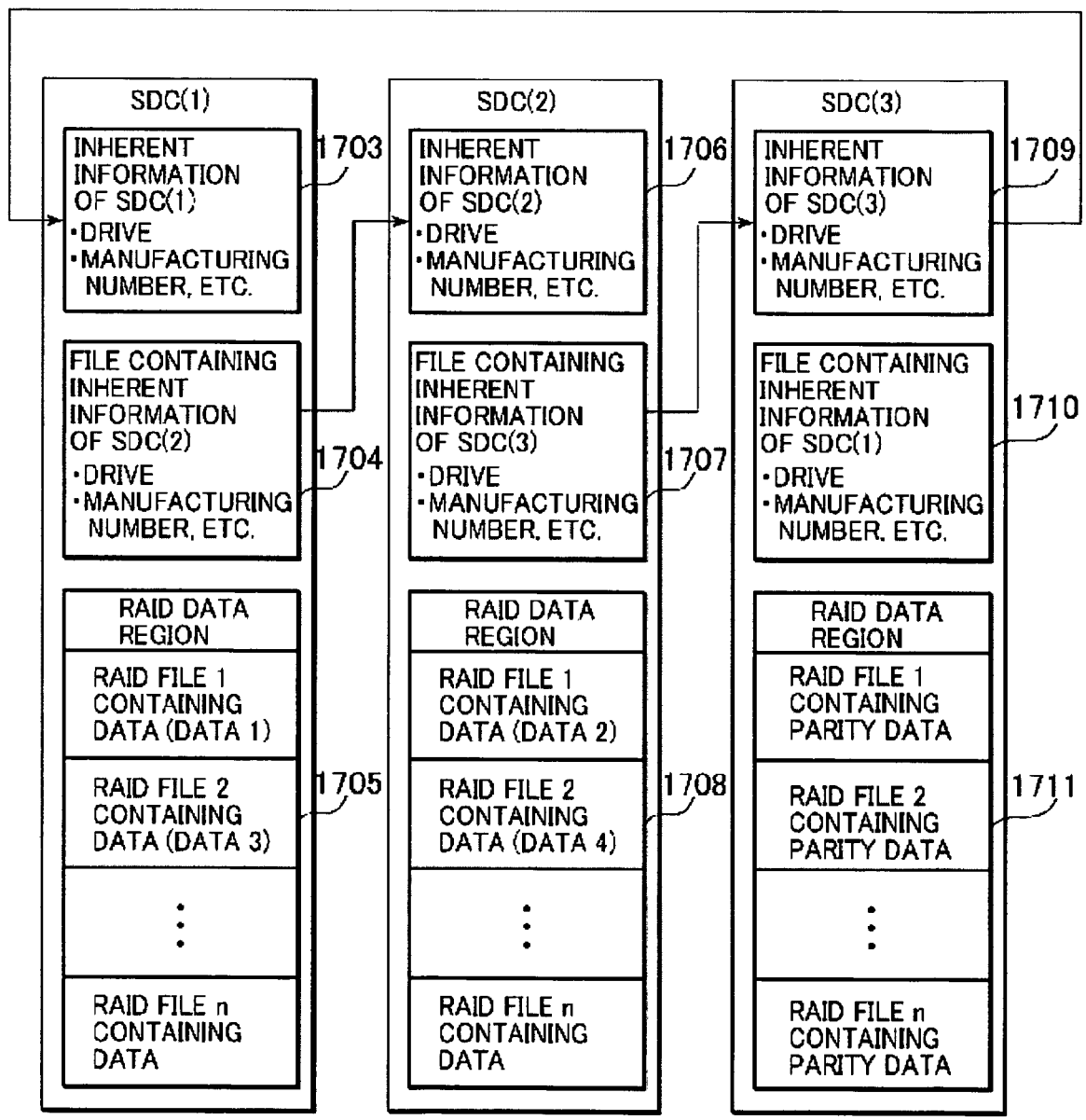
FIG. 24 is a conceptual diagram showing stored contents of the recording media in a case where the data is recorded in each recording medium by use of the FAT file system in the RAID3 recording system (striping system) in step S2110 of FIG. 21.

FIG. 23 is a flowchart of accessibility confirmation processing executed in the step S2107 of FIG. 21. FIG. 24 is a conceptual diagram showing stored contents of each recording medium SDC in a case where the data is recorded in the recording medium SDC by use of the FAT file system in the RAID3 recording system (striping system). It is to be noted that in the drawing, to simplify the description, there is shown a case where there are three inserted recording media SDC (SDC(1) to SDC(3)).

In FIG. 24, in the recording media SDC(1) to SDC(3), there are recorded information 1703, 1706, and 1709 which are inherent in the media. This inherent information include attribute information (drive), manufacturing numbers and the like, and the inherent information is stored in a region which is accessible even in the password-locked state.

Moreover, inherent information files 1704, 1707, and 1710 are recorded in the recording media SDC(1) to SDC(3), respectively. The "inherent information file" is obtained by forming, into the file, the inherent information of the recording medium SDC in which the data is to be recorded next. Therefore, a recording medium SDC to be accessed subsequently to each recording medium SDC is determined by the inherent information file recorded in the recording medium itself. Therefore, the inherent information and the inherent information file of the recording medium form information (predetermined information) which defines an order of access by the RAID recording system. The system control unit 28 determines the data access order by use of the inherent information file.

In the shown example, there are disposed three recording media SDC. Therefore, the inherent information files 1704, 1707, and 1710 contain filed inherent information 1706, 1709, and 1703 of the recording media SDC(2), SDC(3), and SDC(1), respectively. In a case where there are disposed five recording media SDC, in the recording media SDC(4) and SDC(5), there are recorded filed inherent information of the recording media SDC(5) and SDC(1) in which the data is to be recorded next, respectively.

Moreover, RAID data files are stored in regions 1705, 1708, and 1711 of the recording media SDC(1) to SDC(3), respectively. It is assumed that the RAID data files recorded in the respective recording media SDC are the same. To access the data in the RAID recording system, the file name is designated, and the file of each recording medium SDC is accessed to realize the data access. In the RAID3 recording system, data 1, data 2, and parity data are recorded in this order in each recording medium SDC as described above. Therefore, the data 1, data 3, . . . are recorded in the recording medium SDC(1), the data 2, data 4, . . . are recorded in the recording medium SDC(2), and the parity data is recorded in the recording medium SDC(3).

In FIG. 23, first in step S2301, inherent information from all the inserted recording media SDC are acquired. Next, it is judged in step S2302 whether or not the inherent information file of the recording medium SDC to be accessed next exists in the recording medium SDC, that is, whether or not the inherent information file can be opened. As a result of the judgment, in a case where the inherent information file can be opened, the processing advances to step S2302, and the inherent information file is read out. Processing of the steps S2302 to S2308 are sequentially performed with respect to the respective inserted recording media SDC.

Next, in the step S2304, the inherent information of the recording medium SDC which agrees with the contents of the read inherent information file is searched from a plurality of pieces of the inherent information acquired in the step S2301. Moreover, it is judged whether or not the agreeing inherent information exists (step S2305). As a result of the judgment, in a case where the agreeing inherent information does not exist, the processing advances to the step S2306, the user is notified using the GUI or the like that the system is inoperative as the RAID recording system (step S2306), and the processing advances to step S2309.

On the other hand, in a case where the information exists, the processing advances to step S2307, and the accessing data order is determined and stored. This order is determined based on the inherent information acquired in the step S2301 and the inherent information file read in the step S2303. Thereafter, the processing advances to the step S2309.

As a result of the judgment of the step S2302, in a case where the inherent information file cannot be opened, the processing advances to step S2308. It is stored that any inherent information file does not exist in the recording medium SDC, and the processing advances to step S2309.

It is judged in the step S2309 whether or not the confirmation (checking) of the inherent information file with respect to all the recording media SDC has been completed. The processing of the steps S2302 to S2309 is repeated until the checking of the inherent information files is completed with respect to all the recording media SDC. Moreover, after completing the checking of the inherent information files of all the recording media SDC, the processing advances to step S2310, and it is judged whether or not the inherent information files exist in all the recording media SDC.

As a result of the judgment, in a case where the inherent information file exists in any of the recording media SDC, the processing advances to step S2312 to judge whether or not a data recording order is normally stored. As a result of the judgment, in a case where the order is normally stored, it is judged that the data is accessible as the RAID recording system (step S2313), thereby ending the present processing.

On the other hand, in a case where the order is not normally stored, the processing advances to step S2314 to notify the user by use of the GUI or the like that the system is inoperative as the RAID recording system, thereby ending the present processing.

On the other hand, as a result of the judgment of the step S2310, in a case where the inherent information file does not exist in all the recording media SDC, the processing advances to step S2311. Moreover, the inherent information of the recording medium SDC into which the data is to be written next is prepared as a file, and stored with respect to all the recording media SDC. Consequently, when any of the presently inserted recording media SDC is not formatted for the RAID recording, the recording media SDC can be formatted for the RAID recording for use. Thereafter, it is judged that the data is accessible as the RAID recording system (step S2313), thereby ending the present processing.

Figure 25:
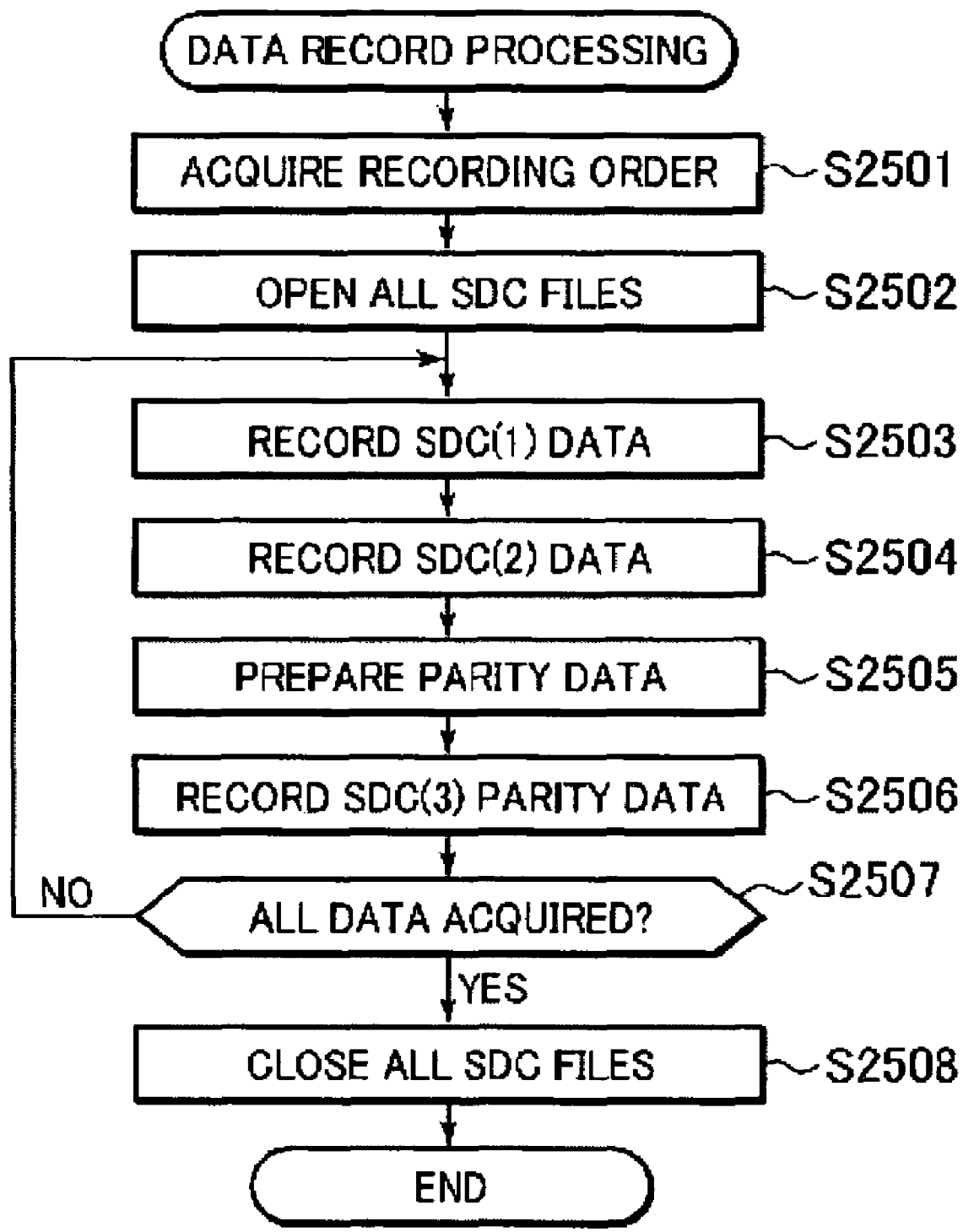
FIG. 25 is a flowchart of data recording processing in a case where the data is recorded using the FAT file system in the RAID3 recording system.

FIG. 25 is a flowchart of a data recording process in a case where the data is recorded using the FAT file system in the RAID3 recording system. The present processing is executed by the system control unit 28, when a data recording request is generated from the user application (layer L1) (see FIG. 5).

First, there is acquired an order of the recording media SDC in which the data are to be recorded by the RAID3 recording system (step S2501), and a plurality of recording media SDC are accessed in order. According to the example of FIG. 24, the media are accessed in order of the recording medium SDC(1)→the recording medium SDC(2)→the recording medium SDC(3). This order will be described hereinafter as an example.

Next, the files of all the recording media SDC are opened with the same file name (step S2502). Moreover, the data is recorded in the first-order recording medium SDC(1) (step S2503), and subsequently the data is recorded in the recording medium SDC(2) (step S2504).

Then, the parity data is prepared (step S2505), and the prepared parity data is recorded in the recording medium SDC(3) subsequently to the recording medium SDC(2) (step S2506). Next, it is judged whether or not all requested data have been recorded (step S2507). The processing of the steps S2503 to S2507 is repeated until all the data is recorded. Moreover, in a case where all the data are recorded, the files of all the recording media SDC are closed (step S2508), thereby ending the present processing.

Figure 26:
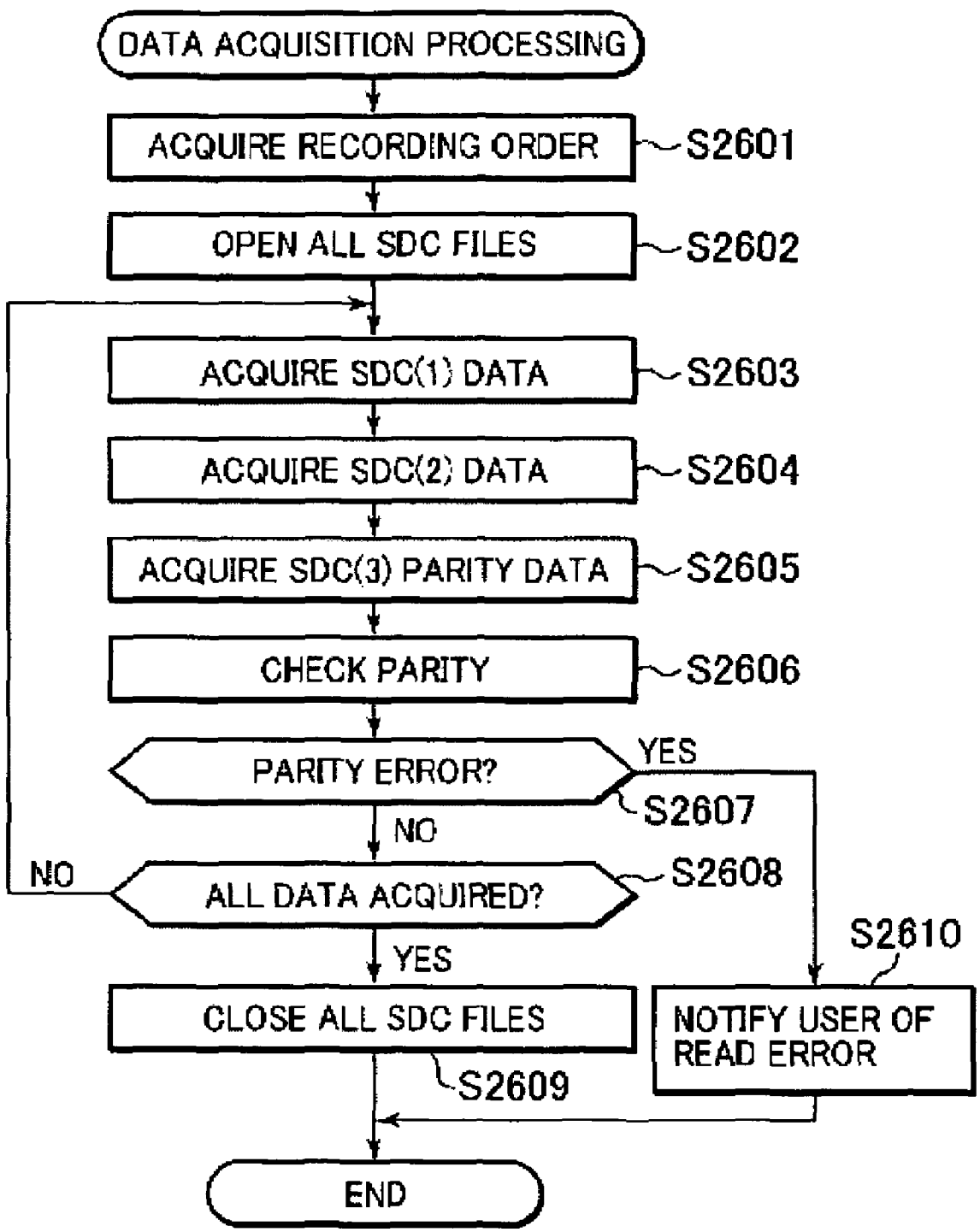
FIG. 26 is a flowchart of data acquisition processing to acquire (read) the data by use of the FAT file system in the RAID3 recording system.

FIG. 26 is a flowchart of data acquisition processing to acquire (read out) the data using the FAT file system in the RAID3 recording system. The present processing is executed by the system control unit 28 at a time when a data acquisition request is generated from the user application.

First, in step S2601, there is acquired an order of the recording media SDC in which the data are to be recorded by the RAID3 recording system, and the media are accessed in order. The order is the same as that described in the processing of FIG. 25.

Next, in step S2602, the files of all the recording media SDC are opened with the same file name. Next, in step S2603, the data is acquired from the first-order recording medium SDC(1), and the data is acquired from the recording medium SDC(2) in step S2604. Next, parity data is acquired from the recording medium SDC(3) in step S2605, and parity check is performed in step S2606. Next, it is judged in step S2607 whether or not a parity error is generated. In a case where the parity error is generated, the processing advances to step S2610 to notify the user that a read error is generated, thereby ending the present processing.

On the other hand, in the case where a parity error is not generated, the processing advances to step S2608 to judge whether or not all requested data have been acquired. As a result of the judgment, in the case where all the data have not been acquired, the processing of the steps S2603 to S2608 is repeated. On the other hand, in the case where all the data are acquired, the files of all the recording media SDC are closed (step S2609), thereby ending the present processing.

It is to be noted that the order of the recording media SDC whose data are to be accessed can be changed, and the recording medium SDC to store and check the parity data can be changed to thereby support a RAID recording system other than the RAID3 recording system.

Figure 27A:
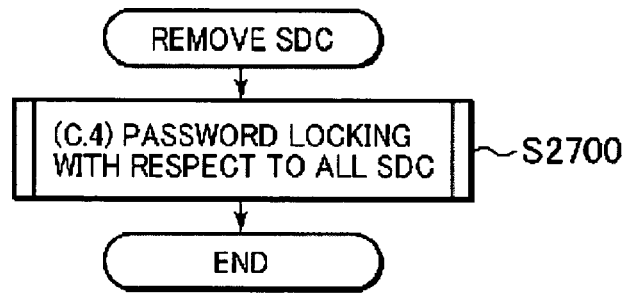
FIG. 27 is a flowchart showing processing at a time when the recording medium is removed (FIG. 27A), and processing at a time when the recording medium is inserted (FIG. 27B)
Figure 27B:
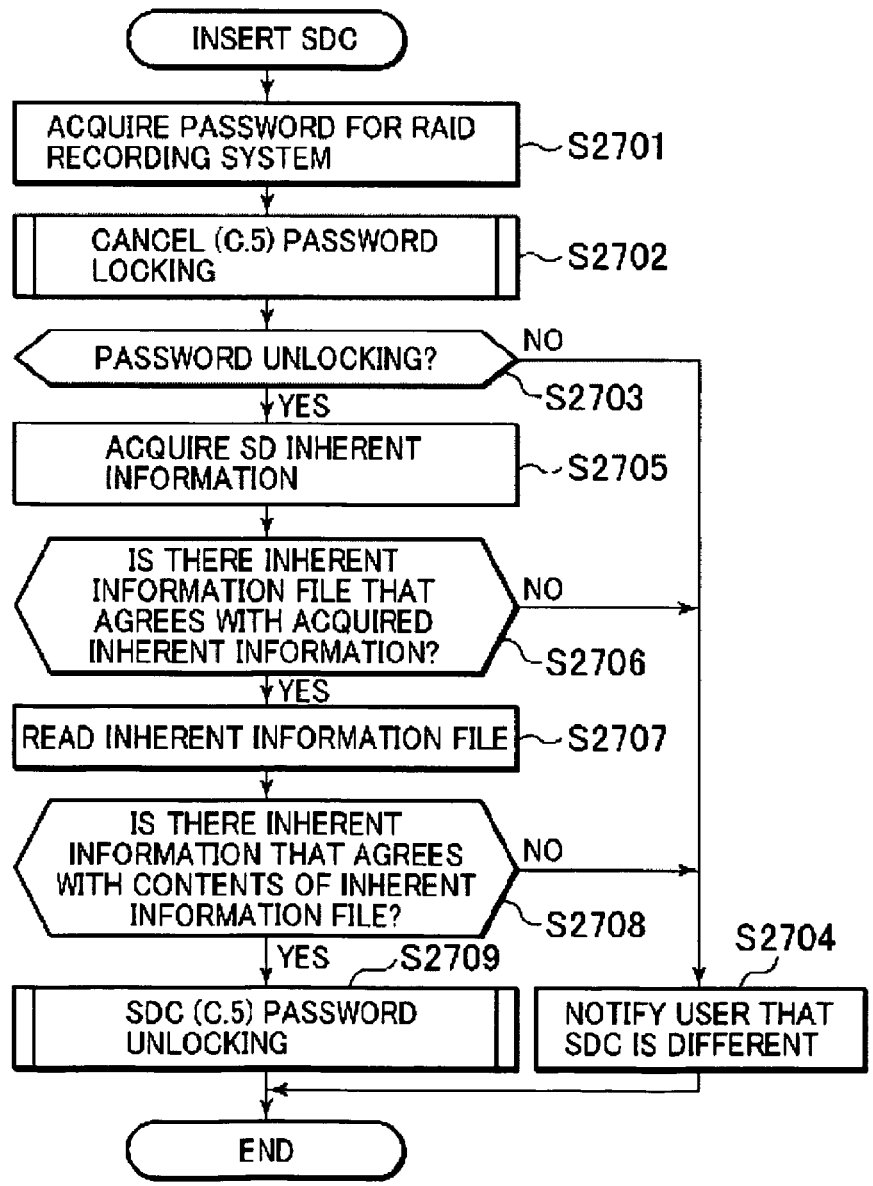

FIGS. 27A and 27B are flowcharts showing processing at a time when the recording medium SDC is inserted and removed. The processing of FIG. 27A is executed by the system control unit 28 when the recording medium SDC is removed, and the processing of FIG. 27B is executed by the system control unit when the recording medium SDC is inserted.

When the data is accessible by the RAID recording system, the recording medium SDC has a state in which the password is set, and password locking is cancelled. When the recording medium SDC is once removed from the card I/F 24, first the processing advances to step S2700 of FIG. 27A. Here, the password locking by the above service (C. 4) is executed using the password for the RAID recording system with respect to the recording medium SDC other than the removed recording medium SDC. This reduces a possibility that the password-locked recording medium SDC is illegally accessed.

Additionally, after the data is recorded in the recording medium SDC by the RAID recording system, the power supply is stopped. Then, as shown in FIG. 17, when power is restored the password is set to each recording medium SDC, and the medium is brought into the password-locked state. Even when these recording media SDC are removed from the image pickup device 1 in this state, and they are inserted into card slots of a device other than the image pickup device 1, the password locking is applied, and the data is inaccessible. Therefore, there is a reduced possibility that the data breaks, and the other device operates incorrectly.

Next, there will be described an operation at a time when the medium is inserted. When the recording medium SDC is inserted into the card I/F 24, the password for the RAID recording system prepared beforehand is acquired in step S2701 of FIG. 27B. Next, in step S2702, the password unlocking by the above service (C. 5) is executed using the password for the RAID recording system. Next, it is judged in step S2703 whether or not the password unlocking can be performed.

As a result of the judgment, in a case where the password unlocking cannot be performed, the processing advances to step S2704. Moreover, the user is notified using the GUI or the like that the presently inserted recording medium SDC is a different recording medium SDC, that is, the medium is not recognized by the RAID recording system. On the other hand, in a case where the password unlocking can be performed, the processing advances to step S2705 to acquire the inherent information from the presently inserted recording medium SDC (e.g., the recording medium SDC(1) in the example of FIG. 24).

Next, it is judged in step S2706 whether or not there exists the inherent information file having contents which agree with those of the acquired inherent information in another recording medium SDC inserted into another card I/F 24 (step S2706). For example, in the example of FIG. 24, it is judged whether or not the inherent information file 1710 of the recording medium SDC(1) exists in another recording medium SDC. If the file does not exist, the processing advances to the step S2704. Moreover, the user is notified using the GUI or the like that the presently inserted recording medium SDC is a different recording medium SDC, that is, the medium is not recognized by the RAID recording system. Accordingly, the present processing ends.

On the other hand, as a result of the judgment of the step S2706, in a case where the inherent information file having the contents which agree with those of the acquired inherent information exists in another recording medium SDC, the processing advances to step S2707. Moreover, the inherent information file is read from the other recording medium SDC (e.g., the recording medium SDC(3) in the example of FIG. 24) in which the agreeing inherent information file exists. Moreover, it is judged in step S2708 whether or not the inherent information agreeing with the read contents of the inherent information file exists in the recording medium SDC other than the recording medium SDC from which the inherent information file is presently read.

For example, in the example of FIG. 24, it is judged whether or not the inherent information 1703 of the recording medium SDC(1) presently exists in the other recording medium SDC. As a result of the judgment, in a case where any information does not exist, the step S2704 is executed. On the other hand, in a case where the information exists (e.g., in the recording medium SDC(1)), the processing advances to step S2709. Moreover, the password unlocking is executed with respect to the presently inserted recording medium SDC by the above service (C. 5) using the password for the RAID recording system of all the recording media SDC. This makes possible the data access by the RAID recording system.

As described above, only in a case where the recording media SDC combined for the RAID recording are all inserted into the image pickup device 1 to which the combination for the RAID recording has been set, the data is appropriately accessible in the image pickup device 1. The appropriateness of the data access is judged by the password, the inherent information, and the inherent information file. Therefore, since the combination for the RAID recording is assured at a time when the data is accessed, any inappropriate access is not made.

According to the present embodiment, it is judged using the password whether or not the recording media SDC inserted into the image pickup device 1 are a combination that is accessible by the RAID recording system. When this is not authenticated, the data cannot be read or written by the RAID recording system. Therefore, even when the recording medium SDC is removed, and inserted into the other image pickup device or the like, a possibility that the recorded data is destroyed is small. Since the password locking is performed by the processing of FIG. 27A even with respect to the recording medium SDC other than the removed recording medium SDC, the data is not illegally accessed. Therefore, even when the recording medium is removed, the data recorded in the recording medium can be protected. Additionally, since the data is recorded by the RAID recording system, the data can be read or written at a high speed.

Moreover, the inherent information and the inherent information file are stored in the respective recording media SDC combined by the RAID recording system. Therefore, even when the recording medium SDC combined for the RAID recording is inserted into any card I/F 24, the data can be constantly read or written in an appropriate order, consistency of the data can be secured. Furthermore, there is disposed a function of changing the password set to the recording medium SDC or setting the password again in accordance with user's selection even in a case where the password unlocking cannot be performed with respect to the inserted recording medium SDC. Therefore, the recording medium SDC other than the recording medium SDC combined for the RAID recording can be used for the RAID recording.

Second Exemplary Embodiment

In the first embodiment, the data is recorded in the recording medium SDC by the RAID recording system in the step S2110 of FIG. 21. Here, if the memory of even one of a plurality of recording media SDC becomes full (there is not any storage capacity), data cannot be recorded any more. On the other hand, in a second embodiment, RAID record processing shown in FIG. 28 described later is executed in the step S2110 of FIG. 21. Accordingly, even if the recording medium SDC having a full memory is generated, a RAID format is set again to a recording medium SDC having an empty region, and the recording is continued. The components of the second embodiment are similar to those of the first embodiment. The second embodiment will be described additionally with reference to FIG. 28, and FIG. 29 replacing FIG. 24 as compared with the first embodiment.

Figure 28:
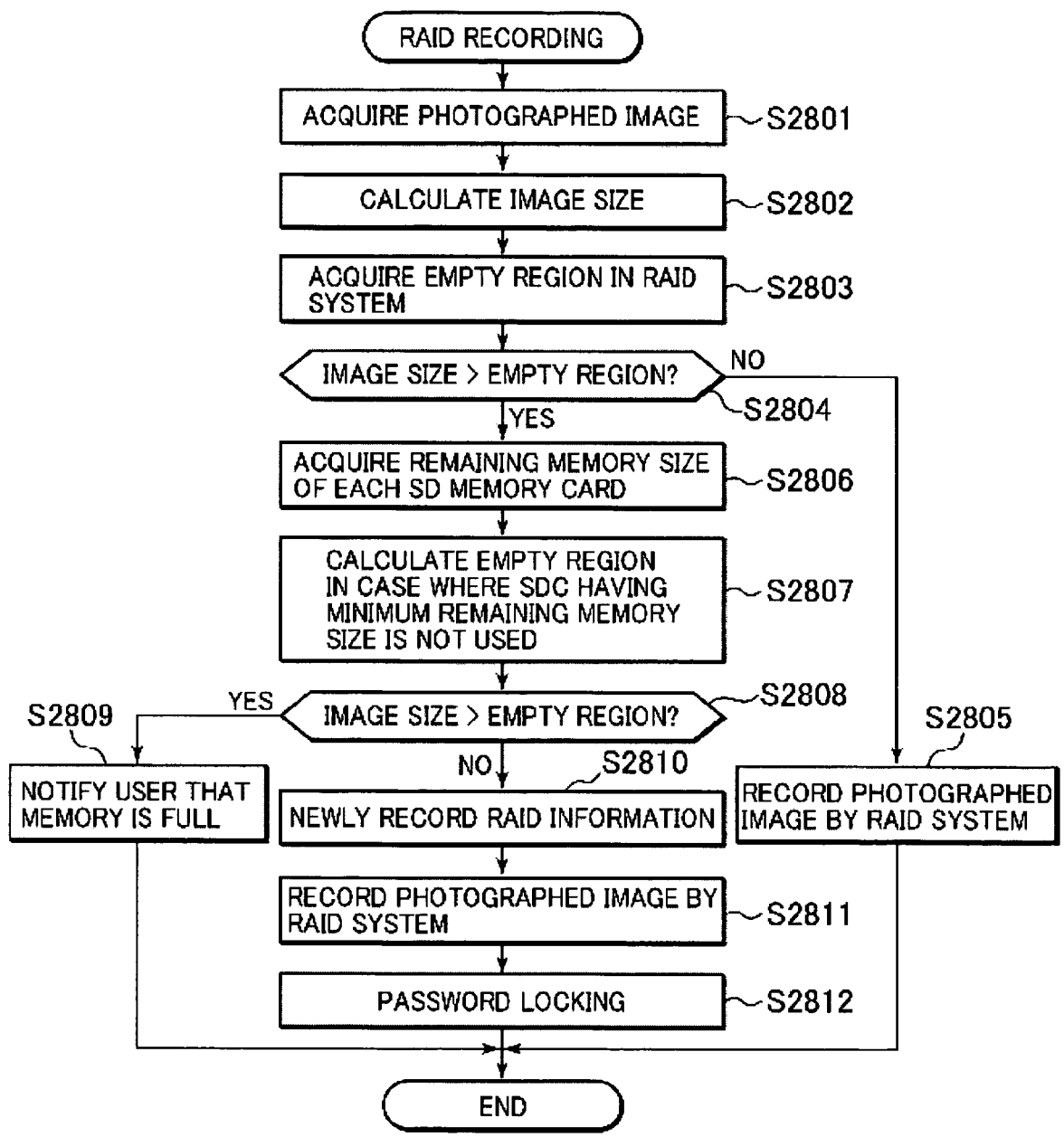
FIG. 28 is a flowchart of RAID recording processing executed at a time when the recording processing is performed by the RAID recording system in step S2110 of FIG. 21 in a second embodiment.

FIG. 28 is a flowchart of RAID record processing executed in the step S2110 of FIG. 21 in a case where the record processing is performed by the RAID recording system. When this processing is started, the password of each inserted recording medium SDC is prepared. The password locking is cancelled. Additionally, each recording medium SDC is ready for the recording by the RAID recording system.

First, when a user performs photographing by operating a GUI or the like in an image pickup device 1, a photographed image is acquired in step S2801, and the size of the acquired photographed image is calculated in step S2802. Next, in step S2803, there is acquired an "empty region" which is recordable by the RAID recording system. Here, the empty region has a capacity obtained by multiplying, by the total number of all recording media SDC, a remaining memory size of a recording medium SDC whose remaining empty region (hereinafter referred to as the "remaining memory size") is minimum in each recording medium SDC among all the recording media SDC.

Next, in step S2804, the calculated image size is compared with the acquired empty region, and it is judged whether or not the image size is larger than the empty region. As a result of the judgment, when the image size≦the empty region, the record processing can be performed without any problem. Therefore, the processing advances to step S2805 to record the photographed image by the RAID recording system.

On the other hand, in a case where the image size>the empty region, the processing advances to step S2806 to acquire the remaining memory size of each inserted recording medium SDC. Next, in step S2807, there are noted a plurality of remaining recording media SDC excluding the recording medium SDC whose remaining memory size is minimum among all the recording media SDC. Moreover, there is calculated the "empty region" in a case where the combination of the RAID recording system is newly constructed by these plurality of remaining recording media SDC. This is because the empty region which is a recordable region sometimes increases, when only recording media SDC having a large remaining memory size are combined to realize the RAID recording system without using the recording medium SDC whose remaining memory size is minimum.

Moreover, the image size is compared with the empty region calculated in the step S2807, and it is judged whether or not the image size is larger than the empty region. As a result of the judgment, in a case where the image size>the empty region, the user is notified using the GUI or the like that the memory is full (step S2809).

On the other hand, in a case where the image size≦the empty region, the processing advances to step S2810. Information (inherent information file, etc.) for the RAID recording system is stored in a plurality of newly combined recording media SDC, that is, a format of the RAID recording system is set again.

Next, in step S2811, the data continues to be recorded in a new combination of recording media SDC by the set RAID recording system, and in step S2812, all passwords of these recording media SDC are locked.

It is to be noted that even when the recording media SDC excluding the recording medium SDC having the minimum remaining memory size are combined in the steps S2807 and S2808, a relation of the image size>the empty region sometimes remains. In this case, the remaining recording media SDC excluding the recording medium SDC having the next smallest remaining memory size may be combined again, and the empty region may be calculated. Accordingly, the empty region sometimes increases.

Figure 29:
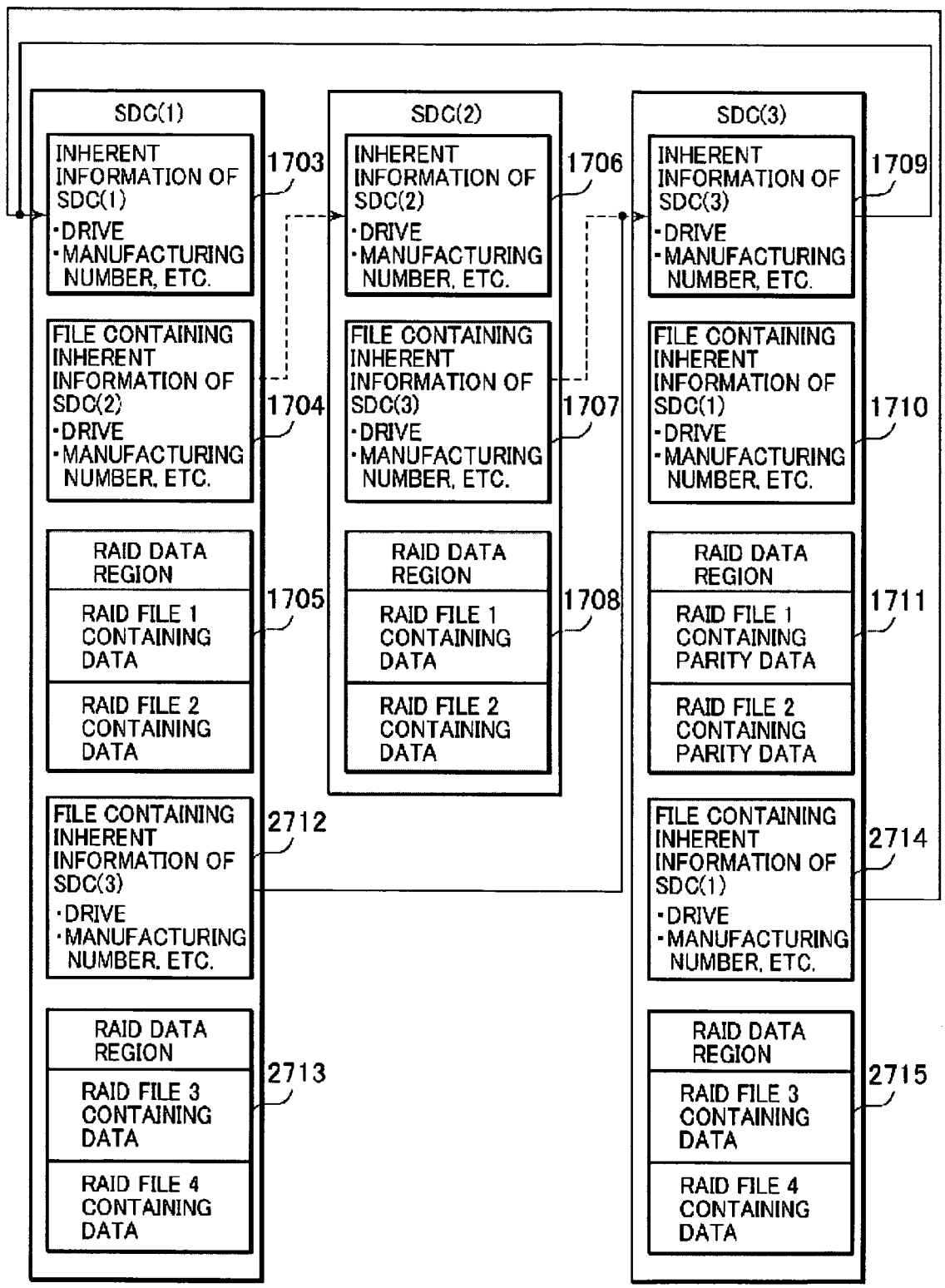
FIG. 29 is a conceptual diagram showing stored contents of each recording medium in which the RAID recording system is set again after a memory of the recording medium becomes full.

FIG. 29 is a conceptual diagram showing stored contents of each recording medium SDC to which the RAID recording system is set again after the memory of the recording medium SDC becomes full. In the drawing, the same elements as those of FIG. 24 are denoted with the same reference numerals.

As shown in FIG. 29, for example, it is assumed that the remaining memory size of the recording medium SDC(2) is minimum as compared with the other two recording media SDC (SDC(1) and SDC(3)). If the remaining memory size of the recording medium SDC(2) is reduced at a time when the data is recorded and processed by the RAID recording system, the recording of the data cannot be continued.

To solve the problem, the remaining recording media SDC (1) and SDC(3) excluding the recording medium SDC(2) are newly combined, and a format of the RAID recording system is stored in regions for use as data regions of the recording media SDC(1) and SDC(3).

Inherent information files 2712 and 2714 are newly recorded in the recording media SDC(1) and SDC(3), respectively. The inherent information files 2712 and 2714 are information obtained by forming, into the files, inherent information 1709 and 1703 of the recording media SDC(3) and SDC (1). Therefore, after the information of these RAID recording systems are stored, a data access order is changed. After the information of the RAID recording system is stored, the data are recorded in the regions 2713 and 2715 of the recording media SDC(1) and SDC(3), respectively.

According to the present embodiment, effects similar to those of the first embodiment can be produced. Furthermore, even if the recording medium SDC remaining memory size is used up, a plurality of recording media SDC are newly combined for RAID recording, so that the recording of the data can be continued.

It is to be noted that the above first and second embodiments have been described in accordance with the example of a camera system, and the image pickup device 1 has been described above as the data recording device, but the present invention is not limited to the embodiments. For example, the present invention is applicable as long as the recording medium SDC is a releasably secured device.

It is to be noted that the SD memory card or the like has been illustrated as the recording medium, but the present invention is applicable as long as the recording medium is a detachably attachable external storage device having an access locking function by the password and an automatic password locking function. As to a plurality of recording media for use, not only the same type of media but also different types of media may be combined. Furthermore, there has been described, as an example, the recording medium having the access locking function by the password and the automatic password locking function, but the present invention is applicable as long as the password locking can be applied to the recording medium after the medium is forcibly removed.

Moreover, the locking function by the password has been described above as an example of the access locking function of the recording medium. However, the present invention is applicable as long as the recording medium has any access locking means that is capable of assuring that the means cannot be automatically cancelled without user's intention in another system.

Furthermore, the password locking function has been described as an example of the function of assuring that the internal data is not changed from a time when the recording medium is forcibly removed until the medium is attached again. However, the present invention is applicable regardless of this function in a case where there exists a function capable of assuring that the internal data is not changed from a time when the medium is forcibly removed until the medium is again inserted.

It is to be noted that data as a recording object is not limited to image data, and text data, voice data and the like may be objects of the recording.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the priority of Japanese Patent Laid-Open No. 2005-114529, filed Apr. 12, 2005, which is hereby incorporated by reference herein in its entirety.

What is claimed is:

1. A data recording device comprising:
   a plurality of individual recording medium attaching units each configured to have attached thereto a respective recording medium;
   a password storage unit configured to store passwords for each respective recording medium associated with the plurality of individual recording medium attaching units;
   an acquisition unit configured to acquire stored passwords for the respective recording media attached to the plurality of medium attaching units, wherein each respective recording medium has a password locking function;
   an access authentication unit configured to judge whether or not a set of the respective recording media attached to the plurality of medium attaching units is accessible by a recording array system which executes at least one of a striping recording operation and mirroring recording operation by using stored passwords from the password storage unit; and
   an access control unit configured to access data from each respective recording medium using the recording system in a case where the access authentication unit authenticates that the respective recording media attached to the plurality of medium attaching units are accessible by the recording array system,
   wherein the access control unit sets again a format of the recording array system to a plurality of respective recording media having empty regions and continues recording remaining data using the recording array system with respect to the plurality of respective recording media to which the format has been set again in a case where there is generated a recording medium whose memory becomes full among the plurality of respective recording media attached to the plurality of medium attaching units during the recording of the data by the striping recording operation or the mirroring recording operation.

2. The data recording device according to claim 1, further comprising:
   a password setting unit which sets the passwords to the respective recording media attached to the plurality of medium attaching units,
   wherein the password storage unit stores the passwords set by the password setting unit.

3. The data recording device according to claim 2, wherein the access authentication unit authenticates whether or not each respective recording medium is accessible by the recording array system on conditions that a password stored in the password storage unit agrees with a passwords set to the respective recording media attached to the respective plurality of medium attaching units.

4. The data recording device according to claim 3, further comprising:
   a password change/re-set unit configured to change or reset the password set to each respective recording medium so as to allow the password stored in the password storage unit to agree with the password set to each respective recording medium attached to each of the plurality of medium attaching units in a case where the passwords do not agree with each other.

5. The data recording device according to claim 1, wherein the access authentication unit performs the authentication depending on whether or not all the respective recording media attached to the plurality of medium attaching units are combined so as to be accessible by the recording array system.

6. The data recording device according to claim 5, wherein the access authentication unit authenticates that all the respective recording media are combined so as to be accessible by the recording array system in a case where all the respective recording media attached to the plurality of medium attaching units are formatted by the recording array system.

7. The data recording device according to claim 5, wherein the access control unit accesses the respective recording media attached to the plurality of medium attaching units in order, and the access authentication unit authenticates that all the respective recording media are combined so as to be accessible by the recording array system in a case where predetermined information which defines an order of the access by the access authentication unit is recorded in each respective recording medium.

8. The data recording device according to claim 7, wherein the access control unit reads and writes data using the recording array system in the order defined based on the predetermined information recorded in each attached respective recording medium even in a case where a respective recording medium is attached to any one of the plurality of medium attaching units.

9. The data recording device according to claim 7, wherein the predetermined information recorded in each recording medium includes at least one of information regarding the corresponding recording medium and information regarding a recording medium whose recording order is subsequent to the corresponding recording medium.

10. An access control method for a data recording device which includes a plurality of individual recording medium attaching units each configured to have attached thereto a respective recording medium; a password storage unit configured to store passwords for each respective recording medium associated with the plurality of medium attaching units; an acquisition unit configured to acquire stored passwords for the respective recording media attached to the plurality of medium attaching units, wherein each of the respective recording media has a password locking function; an access authentication unit configured to judge whether or not a set of the respective recording media attached to the plurality of medium attaching units is accessible by a recording array system which executes at least one of a striping recording operation and mirroring recording operation by using stored passwords from the password storage unit; and an access control unit configured to access data from each respective recording medium using the recording system, the method comprising:
  an acquisition step of acquiring passwords for the respective recording media attached to the plurality of medium attaching units from the password storage unit;
  an access authentication step of judging whether or not the set of respective recording media attached to the plurality of individual medium attaching units are accessible by the recording array system by use of the acquired passwords; and
  an access control step of accessing data of each respective recording medium using the recording array system in a case where the access authentication step authenticates that the respective recording media attached to the plurality of medium attaching units are accessible to the recording array system,
  wherein the access control step sets again a format of the recording array system to a plurality of respective recording media having empty regions, and continues recording of remaining data by the recording array system with respect to the plurality of respective recording media to which the format has been set again in a case where there is generated a recording medium whose memory becomes full among the plurality of respective recording media attached to the plurality of medium attaching units during the recording of the data by the striping recording operation or the mirroring recording operation.

11. The access control method according to claim 10, further comprising:
  a password setting step of setting the passwords to the respective recording media attached to the plurality of medium attaching units, wherein the password storage unit stores the passwords set by the password setting step.

12. The access control method according to claim 11, wherein the access authentication step authenticates whether or not each respective recording medium is accessible by the recording array system on condition that a password stored in the password storage unit agrees with the passwords set to the respective recording media attached to the respective plurality of medium attaching units.

13. The access control method according to claim 12, further comprising:
  a password change/re-set step of changing or setting again the password set to each respective recording medium so as to allow the password stored in the password storage unit to agree with the password set to each respective recording medium attached to each of the plurality of medium attaching units in the case where the passwords do not agree with each other.

14. The access control method according to claim 10, wherein the access authentication step performs the authentication depending on whether or not all the respective recording media attached to the plurality of medium attaching units are combined so as to be accessible by the recording array system.

15. The access control method according to claim 14, wherein the access authentication step authenticates that all the respective recording media are combined so as to be accessible by the recording array system in the case where all the respective recording media attached to the plurality of medium attaching units are formatted by the recording array system.

16. The access control method according to claim 14, wherein the access control step accesses the respective recording media attached to the plurality of medium attaching units in order by the recording array system, and the access authentication step authenticates that all the respective recording media are combined so as to be accessible by the recording array system in a case where predetermined information which defines an order of the access by the access authentication step is recorded in each respective recording medium.

17. The access control method according to claim 16, wherein the access control step reads and writes data by the recording array system in the order defined based on the predetermined information recorded in each attached respective recording medium even in a case where a respective recording medium is attached to any one of the plurality of medium attaching units.

18. The access control method according to claim 16, wherein the predetermined information recorded in each recording medium includes at least one of information regarding the corresponding recording medium and information regarding a recording medium whose recording order is subsequent to the corresponding recording medium.

19. A data recording device comprising:
  a plurality of individual recording medium attaching units each configured to have attached thereto a respective recording medium;
  a password storage unit configured to store passwords for each respective recording medium associated with the plurality of individual recording medium attaching units;
  an acquisition unit configured to acquire stored passwords for the respective recording media attached to the plurality of medium attaching units, wherein each respective recording medium has a password locking function;

an access authentication unit configured to judge whether or not a set of the respective recording media attached to the plurality of medium attaching units is accessible by a recording array system which executes at least one of a striping recording operation and mirroring recording operation by using stored passwords from the password storage unit; and an access control unit configured to access data from each respective recording medium using the recording array system in a case where the access authentication unit authenticates that the respective recording media attached to the plurality of medium attaching units are accessible by the recording array system, wherein the access authentication unit performs the authentication depending on whether or not all the respective recording media attached to the plurality of medium attaching units are combined so as to be accessible by the recording away system, wherein the access control unit accesses the respective recording media attached to the plurality of medium attaching units in order, and the access authentication unit authenticates that all the respective recording media are combined so as to be accessible by the recording away system in a case where predetermined information which defines an order of the access by the access authentication unit is recorded in each respective recording medium, wherein the predetermined information recorded in each recording medium includes at least one of information regarding the corresponding recording medium and information regarding a recording medium whose recording order is subsequent to the corresponding recording medium.

20. An access control method for a data recording device which includes a plurality of individual recording medium attaching units each configured to have attached thereto a respective recording medium; a password storage unit configured to store passwords for each respective recording medium associated with the plurality of medium attaching units; an acquisition unit configured to acquire stored passwords for the respective recording media attached to the plurality of medium attaching units, wherein each of the respective recording media has a password locking function; an access authentication unit configured to judge whether or not a set of the respective recording media attached to the plurality of medium attaching units is accessible by a recording away system which executes at least one of a striping recording operation and mirroring recording operation by using stored passwords from the password storage unit; and an access control unit configured to access data from each respective recording medium using the recording array system, the method comprising:

an acquisition step of acquiring passwords for the respective recording media attached to the plurality of medium attaching units from the password storage unit;

an access authentication step of judging whether or not the set of respective recording media attached to the plurality of individual medium attaching units are accessible by the recording array system by use of the acquired passwords; and an access control step of accessing data of each respective recording medium using the recording array system in a case where the access authentication step authenticates that the respective recording media attached to the plurality of medium attaching units are accessible to the recording array system, wherein the access authentication step performs the authentication depending on whether or not all the respective recording media attached to the plurality of medium attaching units are combined so as to be accessible by the recording away system, wherein the access control step accesses the respective recording media attached to the plurality of medium attaching units in order by the recording array system, and the access authentication step authenticates that all the respective recording media are combined so as to be accessible by the recording array system in a case where predetermined information which defines an order of the access by the access authentication step is recorded in each respective recording medium, wherein the predetermined information recorded in each recording medium includes at least one of information regarding the corresponding recording medium and information regarding a recording medium whose recording order is subsequent to the corresponding recording medium.

* * * * *